US012770911B2

(12) United States Patent
Okuyama et al.

(10) Patent No.: US 12,770,911 B2
(45) Date of Patent: Oct. 20, 2026

(54) MODIFIED SULFIDE SOLID ELECTROLYTE AND METHOD FOR PRODUCING SAME

(71) Applicant: IDEMITSU KOSAN CO., LTD., Tokyo (JP)

(72) Inventors: Tomoyuki Okuyama, Utsunomiya (JP); Nobuhito Nakaya, Ichihara (JP); Hiroto Ida, Narashino (JP); Toshifumi Miyagawa, Chiba (JP); Atsushi Yao, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 603 days.

(21) Appl. No.: 18/272,166

(22) PCT Filed: Jan. 18, 2022

(86) PCT No.: PCT/JP2022/001664

§ 371 (c)(1),
(2) Date: Jul. 13, 2023

(87) PCT Pub. No.: WO2022/158458

PCT Pub. Date: Jul. 28, 2022

(65) Prior Publication Data

US 2024/0105985 A1 Mar. 28, 2024

(30) Foreign Application Priority Data

Jan. 19, 2021 (JP) ................................ 2021-006663

(51) Int. Cl.
*H01M 10/056* (2010.01)
*H01M 10/0525* (2010.01)

(52) U.S. Cl.
CPC ..... *H01M 10/056* (2013.01); *H01M 10/0525* (2013.01); *H01M 2300/0065* (2013.01)

(58) Field of Classification Search
None
See application file for complete search history.

(56) References Cited

U.S. PATENT DOCUMENTS

| | | | | |
|---|---|---|---|---|
| 11,572,459 | B2 * | 2/2023 | Burdynska | C08K 3/30 |
| 11,658,337 | B2 * | 5/2023 | Shibata | H01M 10/052 429/188 |

(Continued)

FOREIGN PATENT DOCUMENTS

| | | | |
|---|---|---|---|
| CN | 107710455 | A | 2/2018 |
| CN | 110498611 | A | 11/2019 |

(Continued)

OTHER PUBLICATIONS

Abstract of JP 2012-226854 A (Year: 2012).*

(Continued)

*Primary Examiner* — Kevin M Bernatz
(74) *Attorney, Agent, or Firm* — Element IP, PLC

(57) ABSTRACT

Provided are: a modified sulfide solid electrode containing a sulfide solid electrolyte having a BET specific surface area of 10 $m^2/g$ or more and containing a lithium atom, a sulfur atom, a phosphorus atom, and a halogen atom, and an epoxy compound, in which the modified sulfide solid electrolyte has a peak at 2800 to 3000 $cm^{-1}$ in an infrared absorption spectrum obtained by FT-IR spectroscopy (ATR method); and a method for producing the modified sulfide solid electrolyte, which has excellent coating suitability when (Continued)

applied as a paste and is capable of efficiently exhibiting excellent battery performance even when a sulfide solid electrolyte having a large specific surface area is used.

18 Claims, 1 Drawing Sheet

(56) References Cited

U.S. PATENT DOCUMENTS

| | | | |
|---|---|---|---|
| 2006/0166003 A1* | 7/2006 | Khabashesku | C01B 32/156 428/408 |
| 2017/0005367 A1 | 1/2017 | Van Berkel et al. | |
| 2019/0356017 A1 | 11/2019 | Osada et al. | |
| 2020/0067137 A1* | 2/2020 | Van Berkel | H01M 50/446 |
| 2020/0328451 A1 | 10/2020 | Suganuma et al. | |
| 2021/0242496 A1 | 8/2021 | Shibata et al. | |
| 2022/0173428 A1 | 6/2022 | Morinaka et al. | |
| 2025/0253333 A1* | 8/2025 | Seda | H01M 10/0525 |

FOREIGN PATENT DOCUMENTS

| | | | |
|---|---|---|---|
| JP | 2012226854 A | * | 11/2012 |
| JP | 2017147173 A | | 8/2017 |
| JP | 2018521173 A | | 8/2018 |
| JP | 2019199394 A | | 11/2019 |
| JP | 2020087633 A | | 6/2020 |
| JP | 2020173992 A | | 10/2020 |
| KR | 1020160013630 A | | 2/2016 |
| KR | 1020180021797 A | | 3/2018 |
| WO | WO-2020105736 A1 | | 5/2020 |
| WO | WO-2020203231 A1 | | 10/2020 |

OTHER PUBLICATIONS

Abstract of JP 2016-147960 A (Year: 2016).*

Extended European Search Report issued Jun. 10, 2025, in corresponding European Patent Application No. 22742580.8, 9 pages.

Office Action issued Jul. 29, 2025, in Japanese Patent Application No. 2022-576696 (with English translation), 8 pages.

Office Action issued Mar. 11, 2025, in corresponding Japanese Patent Application No. 2022-576696 (with English translation), 8 pages.

International Search Report issued Apr. 12, 2022 in PCT/JP2022/001664 (with English translation), 5 pages.

Written Opinion issued Apr. 12, 2022 in PCT/JP2022/001664 (with English translation), 8 pages.

Office Action issued May 7, 2026, in Korean Patent Application No. 10-2023-7023540 (with English translation), 24 pages.

Combined Taiwanese Office Action and Search Report issued Feb. 4, 2026, in corresponding Taiwanese Patent Application No. 111102233 (with machine English translation), 16 pages.

European Communication issued Jan. 14, 2026, in corresponding European Patent Application No. 22742580.8, 8 pages.

R Brdicka, et al., "Surface area and pore size determination Modern Methods in Heterogeneous Catalysis Research", Handbook of Heterogeneous Catalysis, VCH, Weinheim Handbook of Porous Solids, Jan. 1, 2004 (Jan. 1, 2004), XP055643749, 52 pages; Retrieved from the Internet: on Jun. 12, 2018.

* cited by examiner

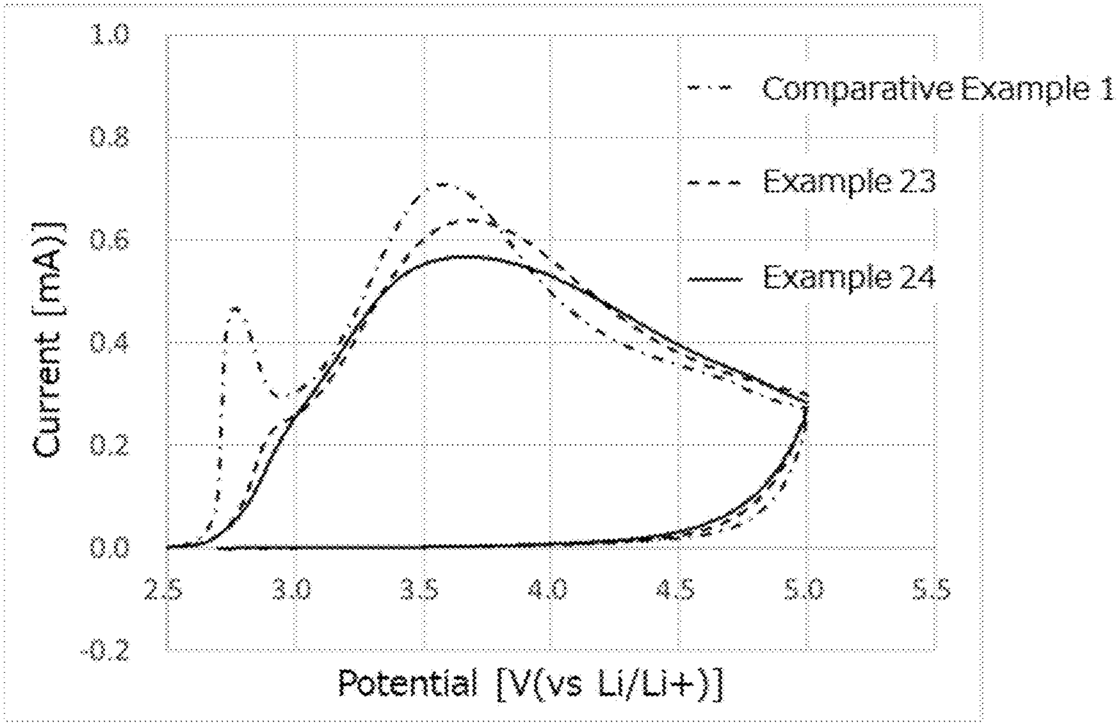
1.0
0.8
0.6
0.4
0.2
0.0
-0.2
Current [mA)]
2.5
3.0
3.5
4.0
4.5
5.0
5.5
Potential [V(vs Li/Li+)]
Comparative Example 1
Example 23
Example 24

MODIFIED SULFIDE SOLID ELECTROLYTE AND METHOD FOR PRODUCING SAME

TECHNICAL FIELD

The present invention relates to a modified sulfide solid electrolyte and a method for producing the same.

BACKGROUND ART

With the rapid spread of information-related devices and communication devices such as personal computers, video cameras, and cellular phones in recent years, the development of batteries to be used as power sources thereof has been emphasized. In particular, lithium ion batteries are attracting attention from the viewpoint of high energy density.

Conventionally, since an electrolytic solution containing a combustible organic solvent is used in a battery used for such an application, it is necessary to attach a safety device for suppressing a temperature rise at the time of a short circuit, and to improve a structure and a material for preventing a short circuit. On the other hand, a battery in which the electrolytic solution is replaced with a solid electrolyte layer has been developed, since the battery is entirely solidified by replacing the electrolytic solution with a solid electrolyte, a combustible organic solvent is not used in the battery, the safety device can be simplified, and the battery is excellent in production cost and productivity.

As a solid electrolyte used for the solid electrolyte layer, a sulfide solid electrolyte has been conventionally known, and the sulfide solid electrolyte is primarily desired to have improved ion conductivity. For example, in order to improve ion conductivity, a method for producing a composite solid electrolyte in which the surface of a sulfide-based solid electrolyte is coated with a predetermined halogenated hydrocarbon compound as a coating material has been proposed (for example, see PTL 1).

As a technique for coating a surface, for example, PTL 2 discloses a solid electrolyte composition in which a coating film is formed on a surface of a sulfide solid electrolyte by a compound having a C═O bond or a compound having an S═O bond in order to improve cycle characteristics by increasing affinity between the sulfide solid electrolyte and an active material used for a negative electrode, a positive electrode, or the like when a lithium ion battery is produced. Further, PTL 3 discloses a sulfide solid electrolyte containing a lithium element, a phosphorus element, and a sulfur element and also containing an ester compound of a carboxylic acid and an alcohol, in which the ester compound is bonded to or adsorbed on the surface of the conductive sulfide and can improve the cycle characteristics of a solid battery, and the sulfide solid electrolyte is obtained by a production method including a step of wet-pulverizing a slurry containing a lithium ion-conductive sulfide, an organic solvent, and an ester compound. As described above, in recent years, in order to put a lithium ion battery into practical use, there have been diversified demands not only for improving the ion conductivity of the sulfide solid electrolyte itself but also for improving other performance. In order to meet such demands, a technique of coating a surface is applied.

CITATION LIST

Patent Literature

PTL 1: JP 2020-87633 A
PTL 2: JP 2017-147173 A
PTL 3: WO 2020/203231

SUMMARY OF INVENTION

Technical Problem

The present invention has been made in view of such circumstances, and an object of the present invention is to provide a modified sulfide solid electrolyte and a method for producing the same, in which even a sulfide solid electrolyte having a large specific surface area is excellent in coating suitability when coated as a paste, and can efficiently exhibit excellent battery performance. Another object of the present invention is to provide an electrode mixture and a lithium ion battery that exhibit excellent battery performance.

Solution to Problem

A modified sulfide solid electrolyte according to the present invention is a modified sulfide solid electrolyte containing: a sulfide solid electrolyte having a BET specific surface area of 10 $m^2/g$ or more and containing a lithium atom, a sulfur atom, a phosphorus atom, and a halogen atom; and an epoxy compound, in which the modified sulfide solid electrolyte has a peak at 2800 to 3000 $cm^{-1}$ in an infrared absorption spectrum obtained by FT-IR spectroscopy (ATR method).

Further, a method for producing a modified sulfide solid electrolyte according to the present invention is a method for producing a modified sulfide solid electrolyte, including: mixing a sulfide solid electrolyte having a BET specific surface area of 10 $m^2/g$ or more and containing a lithium atom, a sulfur atom, a phosphorus atom, and a halogen atom, an epoxy compound, and an organic solvent; and removing the organic solvent.

A modified sulfide solid electrolyte according to the present invention is a modified sulfide solid electrolyte containing: a sulfide solid electrolyte having a BET specific surface area of 10 $m^2/g$ or more and containing a lithium atom, a sulfur atom, a phosphorus atom, and a halogen atom; and an epoxy compound.

An electrode mixture according to the present invention is an electrode mixture containing the modified sulfide solid electrolyte according to the present invention and an electrode active material.

In addition, a lithium ion battery according to the present invention is a lithium ion battery containing at least one of the modified sulfide solid electrolyte according to the present invention and the electrode mixture according to the present invention.

Advantageous Effects of Invention

According to the present invention, it is possible to provide a modified sulfide solid electrolyte having excellent coating suitability when coated as a paste and capable of efficiently exhibiting excellent battery performance, and a method for producing the modified sulfide solid electrolyte. In addition, according to the present invention, it is possible to provide an electrode mixture and a lithium ion battery that exhibit excellent battery performance.

BRIEF DESCRIPTION OF DRAWINGS

FIG. 1 is a CV curve of each of the modified sulfide solid electrolytes of Examples 23 and 24 and the sulfide solid electrolyte of Comparative Example 1.

DESCRIPTION OF EMBODIMENTS

Hereinafter, an embodiment of the present invention (hereinafter, may be referred to as "the present embodiment") will be described. In the description herein, the numerical values of the upper limit and the lower limit related to the numerical ranges of "X or more" and "Y or less", and "X to Y" are numerical values that can be arbitrarily combined, and the numerical values of the Examples can also be used as the numerical values of the upper limit and the lower limit.

(Findings Obtained by the Inventor to Arrive at the Present Invention)

As a result of intensive studies to solve the above-mentioned problems, the present inventors have found the following matters and completed the present invention.

As described in PTLs 1 to 3, a technique of coating a surface of a sulfide solid electrolyte with a certain compound has been conventionally present. PTLs 1 to 3 have a problem to be solved of improving battery performance such as improving ion conductivity and improving cycle characteristics by increasing affinity between a sulfide solid electrolyte and an active material used for a negative electrode, a positive electrode, or the like in producing a lithium ion battery by using the technique.

In the production process of a lithium ion battery (also referred to as an "all-solid battery"), a solid electrolyte, other predetermined components, and a solvent are mixed to prepare a paste, and the paste is coated to form a separator layer and an electrode mixture layer. In order to improve the performance of these layers, it is necessary to improve the density of the solid electrolyte constituting these layers, and it is effective to use a solid electrolyte having a large specific surface area to improve the density.

As described above, there is a demand for using a solid electrolyte having a large specific surface area. However, when the specific surface area of the solid electrolyte is large, the viscosity of the paste is increased, and there is a production problem in that the coating suitability is significantly reduced. On the other hand, when the viscosity of the paste is reduced by using a large amount of a solvent, the coating suitability of the paste can be improved, but there is a problem in that the battery performance is reduced due to an increase in drying time and a reduction in density of the solid electrolyte constituting the layer. Therefore, the coating suitability of the paste and the achievement of high battery performance are in a trade-off relationship. In addition, sulfide solid electrolytes having a large specific surface area of 10 $m^2$/g or more have a high viscosity when formed into a paste, which not only leads to a significant decrease in coating suitability, but also requires a large amount of solvents in order to reduce the viscosity of the paste, which leads to an increase in drying time and a significant decrease in battery performance due to a decrease in density.

As in PTLs 1 to 3, many studies have been made to improve ion conductivity and battery performance. However, in a situation in which practical use of lithium ion batteries is rapidly progressing, the present inventors have paid attention to mass production, and have paid attention to the fact that a method of improving performance in a production process, such as coating suitability of a paste, has not been examined at all.

The present inventors have continued intensive studies focusing on compounds to be coated on surfaces of sulfide solid electrolytes disclosed in PTLs 1 to 3 while following techniques for coating the surfaces of the sulfide solid electrolytes with some compounds, and have found that even sulfide solid electrolytes having a large specific surface area of 10 $m^2$/g or more can be sulfide solid electrolytes which are excellent in coating suitability when coated as a paste and can efficiently exhibit excellent battery performance by adhering a lithium halide to the surfaces thereof. Lithium halides have been used as raw materials for sulfide solid electrolytes. However, it has not been recognized at all and is a surprising phenomenon that even sulfide solid electrolytes having a large specific surface area of 10 $m^2$/g or more are excellent in coating suitability when coated as a paste, by adhering a lithium halide to the surface of a sulfide solid electrolyte.

In the description herein, the term "solid electrolyte" refers to an electrolyte that maintains solid at 25° C. under a nitrogen atmosphere. The "sulfide solid electrolyte" obtained by the production method of the present embodiment is a solid electrolyte that contains a lithium atom, a sulfur atom, a phosphorus atom, and a halogen atom and has ion conductivity caused by the lithium atom.

The "sulfide solid electrolyte" includes both a crystalline sulfide solid electrolyte having a crystal structure and an amorphous sulfide solid electrolyte. In the description herein, the crystalline sulfide solid electrolyte is a solid electrolyte in which a peak derived from the solid electrolyte is observed in an X-ray diffraction pattern in powder X-ray diffraction (XRD) measurement, and is a material regardless of the presence or absence of a peak derived from a raw material of the solid electrolyte. That is, the crystalline sulfide solid electrolyte contains a crystal structure derived from the solid electrolyte, and a part thereof may be a crystal structure derived from the solid electrolyte, or the whole thereof may be a crystal structure derived from the solid electrolyte. The crystalline sulfide solid electrolyte may partially contain an amorphous sulfide solid electrolyte (also referred to as a "glass component") as long as the crystalline sulfide solid electrolyte has the X-ray diffraction pattern as described above. Therefore, the crystalline sulfide solid electrolyte includes so-called glass ceramics obtained by heating an amorphous solid electrolyte (glass component) to a crystallization temperature or higher.

In addition, in the description herein, the amorphous sulfide solid electrolyte (glass component) refers to a solid electrolyte in which an X-ray diffraction pattern in powder X-ray diffraction (XRD) measurement is a halo pattern in which a peak other than a peak derived from a material is not substantially observed, and means that the presence or absence of a peak derived from a raw material of the solid electrolyte does not matter.

The distinction between crystalline and amorphous is applied to both the sulfide solid electrolyte and the modified sulfide solid electrolyte in the present embodiment.

A modified sulfide solid electrolyte according to a first aspect of the present embodiment is a modified sulfide solid electrode containing: a sulfide solid electrolyte having a BET specific surface area of 10 $m^2$/g or more and containing a lithium atom, a sulfur atom, a phosphorus atom, and a halogen atom; and an epoxy compound, in which the modified sulfide solid electrolyte has a peak at 2800 to 3000 $cm^{-1}$ in an infrared absorption spectrum obtained by FT-IR spectroscopy (ATR method).

Typical examples of the sulfide solid electrolyte containing a lithium atom, a sulfur atom, a phosphorus atom, and a halogen atom include a sulfide solid electrolyte obtained by a conventional method, for example, a sulfide solid electrolyte obtained by using lithium sulfide, diphosphorus pentasulfide, a lithium halide, a simple substance halogen, or the like as a raw material. That is, the modified sulfide solid electrolyte of the present embodiment contains a sulfide solid electrolyte having a large specific surface area such as a BET specific surface area of 10 $m^2/g$ or more by a conventional method and an epoxy compound.

In the case of a conventional sulfide solid electrolyte having a large specific surface area such as a BET specific surface area of 10 $m^2/g$ or more, it has been extremely difficult to efficiently form a positive electrode, a negative electrode, and an electrolyte layer because a paste containing the sulfide solid electrolyte in an amount necessary for ensuring the density of the solid electrolyte in the layer in order to exhibit a predetermined battery performance has a significantly reduced coating performance. The sulfide solid electrolyte of the present embodiment is a so-called "modified sulfide solid electrolyte" because the coating suitability is dramatically improved, that is, "modified", by containing the conventional sulfide solid electrolyte and the epoxy compound.

In addition, the modified sulfide solid electrolytes according to the first aspect have a peak at 2800 to 3000 $cm^{-1}$ in an infrared absorption spectrum obtained by FT-IR spectroscopy (ATR method). Since the peak is not detected from the sulfide solid electrolytes, it is considered to be a peak derived from the epoxy compound contained in the modified sulfide solid electrolytes.

A modified sulfide solid electrolyte according to a second aspect of the present embodiment is a modified sulfide solid electrolyte in which a peak detected at 2800 to 3000 $cm^{-1}$ in an infrared absorption spectrum obtained by FT-IR spectroscopy (ATR method) is derived from C—H stretching vibration of an alkyl chain in the epoxy compound. As described above, the peak is a peak that is not detected in the sulfide solid electrolyte according to the conventional method, and is a peak that appears by containing the epoxy compound, and it is considered that the epoxy compound is present while maintaining its structure.

In the modified sulfide solid electrolyte of the present embodiment, it is not certain how the epoxy compound is contained, but it is presumed that the epoxy compound adheres to the surface of the sulfide solid electrolyte while maintaining its structure. This is because, according to Examples to be described later, the peaks are clearly detected, and thus the epoxy compound is considered to be present in an easily detectable form.

In addition, according to the comparison between Examples and Comparative Examples to be described later, it is confirmed that the modified sulfide solid electrolyte of the present embodiment has a lower oil absorption than a sulfide solid electrolyte not containing an epoxy compound. It is natural to consider that the reduction in oil absorption is due to the epoxy compound adhering to the surface of the sulfide solid electrolyte and blocking at least a portion of the pores of the sulfide solid electrolyte. It is generally known that the improvement of coating suitability is related to the oil absorption as well as the specific surface area. It is presumed that when the epoxy compound adheres to the surface of the sulfide solid electrolyte, the oil absorption is reduced and the coating suitability is improved.

With respect to the adhesion of the epoxy compound to the surface of the sulfide solid electrolyte, details of the mode of adhesion, that is, whether the adhesion is physical adhesion or chemical adhesion, are also unknown. However, since a hetero atom such as an oxygen atom has a property of being easily bonded to a lithium atom, a halogen atom, or the like, there is a high possibility that the oxygen atom contained in the epoxy compound is bonded to the lithium atom, the halogen atom, or the like constituting the sulfide solid electrolyte and adheres to the surface, that is, chemical adhesion.

In the modified sulfide solid electrolyte of the present embodiment, it is considered that even if the adhesion is any of the above, when the epoxy compound is adhered to the surface, the oil absorption is easily reduced, and as a result, the coating suitability is improved, and the battery performance can be improved.

A modified sulfide solid electrolyte according to a third aspect of the present embodiment has a peak of 0.0 to 5.0 ppm derived from the alkyl chain in the $^1$H-NMR spectrum. The modified sulfide solid electrolyte according to the present embodiment has this peak, and it is considered that the epoxy compound is present while maintaining its structure in the modified sulfide solid electrolyte.

A modified sulfide solid electrolyte according to a fourth aspect of the present embodiment specifies that at least one compound selected from an epoxy compound 1 represented by the general formula (1), an epoxy compound 2 represented by the general formula (2), and an epoxy compound 3 represented by the general formula (3) is used as the epoxy compound. The epoxy compounds represented by the general formulas (1) to (3) will be described in detail later.

The modified sulfide solid electrolyte of the present embodiment has excellent coating suitability as long as the modified sulfide solid electrolyte contains an epoxy compound. In particular, by using a specific epoxy compound, that is, the epoxy compounds 1 to 3, excellent coating suitability is easily obtained, and the coating suitability itself is improved. It is considered that, by adopting an epoxy compound having a certain molecular size or more as represented by the general formulas (1) to (3), the effect of reducing the oil absorption is easily obtained, and the coating suitability can be easily improved.

In a modified sulfide solid electrolyte according to a fifth aspect of the present embodiment, a content of the epoxy compound is 0.03 parts by mass or more and 25 parts by mass or less with respect to 100 parts by mass of the sulfide solid electrolyte.

When the content of the epoxy compound is within the above-described range, the epoxy compound can be appropriately dispersed and adhered to the surface of the sulfide solid electrolyte to reduce the oil absorption, and the lithium ion conductivity can be appropriately maintained, and therefore, the coating suitability is easily improved, and excellent battery performance is easily efficiently exhibited. If the amount of the epoxy compound used in the production of the modified sulfide solid electrolyte is known, the amount of the epoxy compound used is used as the "content of the epoxy compound".

In a modified sulfide solid electrolyte according to a sixth aspect of the present embodiment, the epoxy compound has a molecular weight of 60 or more.

As described above, when an epoxy compound having a certain molecular size or more is used, the effect of reducing the oil absorption can be easily obtained, and the coating suitability can be easily improved.

A modified sulfide solid electrolyte according to a seventh aspect of the present embodiment is a modified sulfide solid electrolyte, in which the epoxy compound 1 in the fourth aspect is a compound represented by the general formula (1), in which $X^{11}$ is a monovalent hydrocarbon group having 3 to 24 carbon atoms or a monovalent halogenated hydrocarbon group having 3 to 24 carbon atoms, and $X^{12}$ and $X^{13}$ are each a hydrogen atom.

Among the epoxy compounds 1 represented by the general formula (1), those specified in the seventh aspect are easily adhered to the surface of the sulfide solid electrolyte to reduce the oil absorption, and thus the coating suitability is easily improved, and excellent battery performance is easily efficiently exhibited.

A modified sulfide solid electrolyte according to an eighth aspect of the present embodiment is a modified sulfide solid electrolyte, in which the epoxy compound 2 in the fourth aspect is a compound represented by the general formula (2), in which $X^{21}$ is a group represented by the general formula (2a), $X^{22}$ and $X^{23}$ are each a hydrogen atom, and in the general formula (2a), $R^{21}$ is a divalent hydrocarbon group having 1 to 4 carbon atoms, and $R^{22}$ is a monovalent hydrocarbon group having 2 to 24 carbon atoms.

Among the epoxy compounds 2 represented by the general formula (2), those specified in the eighth aspect are easily adhered to the surface of the sulfide solid electrolyte to reduce the oil absorption, and thus the coating suitability is easily improved, and excellent battery performance is easily efficiently exhibited.

A modified sulfide solid electrolyte according to a ninth aspect of the present embodiment is a modified sulfide solid electrolyte, in which the epoxy compound 3 in the fourth aspect is a compound represented by the general formula (3), in which $X^{31}$ is a group represented by the general formula (3a), $X^{32}$ and $X^{33}$ are each a hydrogen atom, and in the general formula (3a), $R^{31}$ is a divalent hydrocarbon group having 1 to 4 carbon atoms, $R^{32}$ is a divalent hydrocarbon group having 2 to 8 carbon atoms, $X^{34}$ and $X^{36}$ are each a group represented by the general formula (3b), and $X^{35}$ is a monovalent hydrocarbon group having 1 to 4 carbon atoms, and in the general formula (3b), $R^{34}$ to $R^{36}$ are each a monovalent hydrocarbon group having 1 to 4 carbon atoms.

Among the epoxy compounds 3 represented by the general formula (3), those specified in the ninth aspect are easily adhered to the surface of the sulfide solid electrolyte to reduce the oil absorption, and thus the coating suitability is easily improved, and excellent battery performance is easily efficiently exhibited.

A modified sulfide solid electrolyte according to a tenth aspect of the present embodiment is a modified sulfide solid electrolyte, in which the epoxy compound 3 in the fourth aspect is a compound represented by the general formula (3), in which $X^{31}$ is a group represented by the general formula (3a), $X^{22}$ and $X^{23}$ are each a hydrogen atom, and in the general formula (3a), $R^{31}$ is a divalent hydrocarbon group having 1 to 4 carbon atoms, $R^{32}$ is a single bond, and $X^{34}$ to $X^{36}$ are each a monovalent hydrocarbon group having 1 to 8 carbon atoms.

Among the epoxy compounds 3 represented by the general formula (3), those specified in the tenth aspect are easily adhered to the surface of the sulfide solid electrolyte to reduce the oil absorption, similarly to the compound specified in the ninth aspect, and thus the coating suitability is easily improved, and excellent battery performance is easily efficiently exhibited.

A method for producing a modified sulfide solid electrolyte according to an eleventh aspect of the present embodiment is a method including: mixing a sulfide solid electrolyte having a BET specific surface area of 10 $m^2/g$ or more and containing a lithium atom, a sulfur atom, a phosphorus atom, and a halogen atom, an epoxy compound, and an organic solvent; and removing the organic solvent.

As described above, the method for producing a modified sulfide solid electrolyte of the present embodiment is not particularly limited as long as the modified sulfide solid electrolyte contains an epoxy compound, but according to the method for producing a modified sulfide solid electrolyte according to the eleventh aspect of the present embodiment, the epoxy compound can be present so as to adhere to the surface of the sulfide solid electrolyte from the viewpoint of its characteristics, and therefore, the modified sulfide solid electrolyte has excellent coating suitability and efficiently exhibits excellent battery performance, and such a modified sulfide solid electrolyte of the present embodiment can be produced more efficiently.

Although a mixture in the form of a solution or a slurry is obtained by mixing the sulfide solid electrolyte, the epoxy compound, and the organic solvent, since the modified sulfide solid electrolyte cannot be used as it is, the method includes removing the organic solvent from the solution or the slurry.

In a method for producing a modified sulfide solid electrolyte according to a twelfth aspect of the present embodiment, the organic solvent used in the production method of the eleventh aspect is at least one solvent selected from an aliphatic hydrocarbon solvent, an alicyclic hydrocarbon solvent, an aromatic hydrocarbon solvent, an ester-based solvent, a nitrile-based solvent, and an ether-based solvent.

By using the solvent as the organic solvent, the adhesion of the epoxy compound to the surface of the sulfide solid electrolyte can be promoted, and the coating suitability can be easily improved.

An electrode mixture according to a thirteenth aspect of the present embodiment contains the modified sulfide solid electrolyte or the like according to the first aspect and an electrode active material.

A lithium ion battery according to a fourteenth aspect of the present embodiment contains at least one of the modified sulfide solid electrolyte or the like according to the first aspect and the electrode active material according to the thirteenth aspect.

As described above, the modified sulfide solid electrolyte of the present embodiment is excellent in coating suitability when coated as a paste, and can efficiently exhibit excellent battery performance. Therefore, since the electrode mixture containing the modified sulfide solid electrolyte of the present embodiment is also excellent in coating suitability, a lithium ion battery can be efficiently produced, and the obtained lithium ion battery has excellent battery performance.

A modified sulfide solid electrolyte according to a fifteenth aspect of the present embodiment is a modified sulfide solid electrode containing: a sulfide solid electrolyte having a BET specific surface area of 10 $m^2/g$ or more and containing a lithium atom, a sulfur atom, a phosphorus atom, and a halogen atom; and an epoxy compound.

The modified sulfide solid electrolyte having such a configuration also exhibits the same effect as the modified sulfide solid electrolyte of the first aspect, that is, an effect of being excellent in coating suitability when coated as a paste and being capable of efficiently exhibiting excellent battery performance. It can also be said that the modified sulfide solid electrolytes of the first embodiment are defined to have a peak at 2800 to 3000 $cm^{-1}$ in the infrared absorption spectrum by FT-IR spectroscopy (ATR method) in the modified sulfide solid electrolytes of the fifteenth embodiment. However, this is because the peak is a peak derived from the epoxy compound contained in the modified sulfide solid electrolytes as described above and indicates that the peak is expressed by containing the epoxy compound.

An electrode mixture according to a sixteenth aspect of the present embodiment contains the modified sulfide solid electrolyte according to the fifteenth aspect and an electrode active material.

A lithium ion battery according to a seventeenth aspect of the present embodiment contains at least one of the modified sulfide solid electrolyte or the like according to the fifteenth aspect and the electrode active material according to the sixteenth aspect.

The electrode mixture and the lithium ion battery are the same as those described for the electrode mixture of the thirteenth aspect and the lithium ion battery of the fourteenth aspect.

[Modified Sulfide Solid Electrolyte]

The modified sulfide solid electrolyte of the present embodiment is a modified sulfide solid electrode containing: a sulfide solid electrolyte having a BET specific surface area of 10 $m^2/g$ or more and containing a lithium atom, a sulfur atom, a phosphorus atom, and a halogen atom; and an epoxy compound, in which the modified sulfide solid electrolyte has a peak at 2800 to 3000 $cm^{-1}$ in an infrared absorption spectrum obtained by FT-IR spectroscopy (ATR method). Since the peak is not detected in the sulfide solid electrolyte not containing the epoxy compound, the peak is a peak derived from the epoxy compound.

In the description herein, the FT-IR spectroscopy is an analysis using a Fourier transform infrared spectrophotometer and means a measurement employing an attenuated total reflection method (ATR method), and the infrared absorption spectrum is a spectrum measured under the following conditions using an FT-IR apparatus.

Measurement method: attenuated total reflection method (ATR method)
Measurement wave number range: 650 to 4000 $cm^{-1}$
Illuminant: Globar lamp (SiC)
Detector: DTGS detector
Resolution: 4 $cm^{-1}$
Measurement time: 1 second/time
Number of integrations: 256

In the infrared absorption spectrum, the peak at 2800 to 3000 $cm^{-1}$ is known to be derived from C—H stretching vibration. As described above, the peak is considered to be a peak derived from the epoxy compound, and more specifically, the peak is derived from the C—H bond of the epoxy compound. Further, when the epoxy compound has an alkyl chain, the peak is derived from a C—H bond (C—H stretching vibration) of the alkyl chain in the epoxy compound.

In the modified sulfide solid electrolyte of the present embodiment, since the peak is clearly detected, it is considered that the epoxy compound is contained in an easily detectable form, that is, the epoxy compound is present so as to adhere to the surface of the sulfide solid electrolyte. In addition, it is considered that, due to such a presence, the oil absorption of the sulfide solid electrolyte can be reduced, and excellent coating suitability can be obtained.

The modified sulfide solid electrolytes of the present embodiment preferably have a peak of 0.0 to 5.0 ppm derived from the alkyl chain of the epoxy compound in the $^1$H-NMR spectrum.

In the description herein, the peak by the $^1$H-NMR spectrum is measured under the following conditions using a nuclear magnetic resonance apparatus (NMR apparatus).

Observation nucleus: $^1$H
Resonance frequencies: 500 MHz
Probe: 5 mmφ TCI cryoprobe
Measurement temperature: 25° C.
Number of integrations: 16

As described above, the modified sulfide solid electrolyte of the present embodiment has a peak at 2800 to 3000 $cm^{-1}$ in the infrared absorption spectrum, and it is considered that the modified sulfide solid electrolyte is present in such a manner that the peak is clearly detected, that is, the modified sulfide solid electrolyte is present so as to adhere to the surface of the sulfide solid electrolyte. It is considered that the detection of a peak derived from the alkyl chain in the $^1$H-NMR spectrum also means that the peak is present so as to adhere to the surface of the sulfide solid electrolyte as in the infrared absorption spectrum, and excellent coating suitability is obtained.

In addition, as shown in the Examples which will be described later, regarding the modified sulfide solid electrolyte obtained by mixing the sulfide solid electrolyte and the epoxy compound in an organic solvent, when the modified sulfide solid electrolyte is added to a solvent such as toluene and allowed to stand in a slurry state, and then the supernatant liquid thereof is analyzed by gas chromatography mass spectrometry (GC/MS method), no epoxy compound is detected, whereas regarding the precipitated powder, when the solvent is dried and removed, and then the powder is dissolved in deuterated methanol, and $^1$H-NMR measurement is performed, a chemical shift of a group (alkyl group or the like) derived from the epoxy compound is detected.

From this phenomenon, it is considered that in the modified sulfide solid electrolyte, the epoxy compound strongly adheres to the surface of the sulfide solid electrolyte, and the oil absorption is reduced by the adhesion, and the coating suitability becomes excellent.

In a case where the epoxy compound adheres to the surface of the sulfide solid electrolyte, the epoxy compound may adhere so as to cover the entire surface of the sulfide solid electrolyte or may adhere to a part of the sulfide solid electrolyte.

The epoxy compound is not particularly limited as long as it is a compound having an epoxy ring, and from the viewpoint of more efficiently improving coating suitability and improving battery performance, preferred examples thereof include epoxy compounds 1 to 3 represented by the following general formulas (1) to (3).

(Epoxy Compound 1)

The epoxy compound 1 is a compound represented by the following general formula (1).

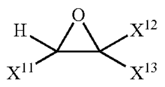
(1)

In the general formula (1), $X^{11}$ to $X^{13}$ are each independently a hydrogen atom, a halogen atom, a monovalent hydrocarbon group, or a monovalent halogenated hydrocarbon group, and at least one of $X^{11}$ to $X^{13}$ is a monovalent hydrocarbon group or a monovalent halogenated hydrocarbon group.

Examples of the monovalent hydrocarbon group of $X^{11}$ to $X^{13}$ include a monovalent aliphatic hydrocarbon group, an alicyclic hydrocarbon group, and an aromatic hydrocarbon group, an aliphatic hydrocarbon group and an alicyclic hydrocarbon group are preferable, and an aliphatic hydrocarbon group is more preferable.

Examples of the aliphatic hydrocarbon group preferably include an alkyl group and an alkenyl group, and an alkyl group is preferable. The number of carbon atoms in the aliphatic hydrocarbon group, when it is an alkyl group, is preferably 1 or more, more preferably 2 or more, still more preferably 4 or more, and even more preferably 6 or more, and the upper limit thereof is preferably 24 or less, more preferably 20 or less, and still more preferably 16 or less. The number of carbon atoms in the aliphatic hydrocarbon group, when it is an alkenyl group, is preferably 2 or more, and more preferably 4 or more, and the upper limit thereof is preferably 24 or less, more preferably 20 or less, and still more preferably 16 or less.

The aliphatic hydrocarbon group of $X^{11}$ to $X^{13}$ may be either linear or branched, and is preferably linear. Further, the aliphatic hydrocarbon group may be partially substituted with a hydroxy group or the like. When two or more of $X^{11}$ to $X^{13}$ are aliphatic hydrocarbon groups, the two or more aliphatic hydrocarbon groups may be the same or different.

Preferred examples of the monovalent alicyclic hydrocarbon group of $X^{11}$ to $X^{13}$ include a cycloalkyl group and a cycloalkenyl group, and a cycloalkyl group is preferable. The number of carbon atoms of the alicyclic hydrocarbon group is 3 or more and preferably 4 or more, and the upper limit thereof is preferably 12 or less, more preferably 8 or less, and still more preferably 6 or less.

The alicyclic hydrocarbon groups of $X^{11}$ to $X^{13}$ may be partially substituted with a hydroxy group, the monovalent aliphatic hydrocarbon group (for example, an alkyl group and an alkenyl group), or the like. When two or more of $X^{11}$ to $X^{13}$ are alicyclic hydrocarbon groups, the two or more alicyclic hydrocarbon groups may be the same or different.

Examples of the monovalent aromatic hydrocarbon group of $X^{11}$ to $X^{13}$ include a phenyl group, a naphthyl group, a biphenyl group, a diphenylmethyl group, a trityl group, an anthranyl group, a perylenyl group, and a pyrenyl group.

The monovalent aromatic hydrocarbon group of $X^{11}$ to $X^{13}$ may be partially substituted with a hydroxy group, the monovalent aliphatic hydrocarbon group (for example, an alkyl group and an alkenyl group), or the like. When two or more of $X^{11}$ to $X^{13}$ are aromatic hydrocarbon groups, the two or more aromatic hydrocarbon groups may be the same or different.

Examples of the monovalent halogenated hydrocarbon group of $X^{11}$ to $X^{13}$ include a group in which a part of the hydrocarbon group exemplified as the hydrocarbon group of $X^{11}$ to $X^{13}$ is substituted with a halogen atom. As the hydrocarbon group substituted with a halogen atom, among the monovalent hydrocarbon groups described above, an aliphatic hydrocarbon group and an alicyclic hydrocarbon group are preferable, an aliphatic hydrocarbon group is more preferable, and an alkyl group is still more preferable.

The halogen atom contained in the monovalent halogenated hydrocarbon group of $X^{11}$ to $X^{13}$ is preferably a fluorine atom, a chlorine atom, a bromine atom, or an iodine atom, more preferably a fluorine atom, a chlorine atom, or a bromine atom, and still more preferably a fluorine atom.

The number of halogen atoms in the halogenated hydrocarbon group varies depending on the number of carbon atoms of the hydrocarbon group and thus cannot be determined unconditionally, but is preferably 1 or more, more preferably 2 or more, still more preferably 3 or more, and even more preferably 6 or more, and the upper limit thereof is preferably 16 or less, more preferably 12 or less, and still more preferably 9 or less.

The halogen atom in $X^{11}$ to $X^{13}$ is preferably a fluorine atom, a chlorine atom, a bromine atom, or an iodine atom, more preferably a fluorine atom, a chlorine atom, or a bromine atom, and still more preferably a fluorine atom, as with the halogen atom that can be contained in the halogenated hydrocarbon group.

At least one of $X^{11}$ to $X^{13}$ is a monovalent hydrocarbon group or a monovalent halogenated hydrocarbon group, that is, one, two, or three of $X^{11}$ to $X^{13}$ may be a monovalent hydrocarbon group or a monovalent halogenated hydrocarbon group, and from the viewpoint of improving coating suitability, one is preferably a monovalent hydrocarbon group or a monovalent halogenated hydrocarbon group.

The epoxy compound 1 represented by the general formula (1) is preferably a compound in which $X^{11}$ is a monovalent hydrocarbon group having 1 to 24 carbon atoms or a monovalent halogenated hydrocarbon group having 1 to 24 carbon atoms, and $X^{12}$ and $X^{13}$ are each a hydrogen atom. The hydrocarbon group is preferably an aliphatic hydrocarbon group as described above, more preferably an alkyl group or an alkenyl group, and still more preferably an alkyl group. The number of carbon atoms is also as described above, and in the case of an alkyl group, it is preferably 1 or more, more preferably 2 or more, still more preferably 4 or more, and even more preferably 6 or more, and the upper limit thereof is preferably 24 or less, more preferably 20 or less, and still more preferably 16 or less.

(Epoxy Compound 2)

The epoxy compound 2 is a compound represented by the following general formula (2).

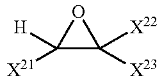

(2)

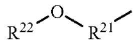

(2a)

In the general formula (2), $X^{21}$ to $X^{23}$ are each independently a hydrogen atom, a halogen atom, a monovalent hydrocarbon group, a monovalent halogenated hydrocarbon group, or a group represented by the general formula (2a), and at least one of $X^{21}$ to $X^{23}$ is a group represented by the general formula (2a). In the general formula (2a), $R^{21}$ is a divalent hydrocarbon group, and $R^{22}$ is a hydrogen atom, a halogen atom, a monovalent hydrocarbon group, or a monovalent halogenated hydrocarbon group.

Examples of the monovalent hydrocarbon group of $X^{21}$ to $X^{23}$ include the same monovalent aliphatic hydrocarbon group, alicyclic hydrocarbon group, and aromatic hydrocarbon group as those exemplified as the monovalent hydrocarbon group of $X^{11}$ to $X^{13}$, and the monovalent hydrocarbon group is preferably an aliphatic hydrocarbon group or an alicyclic hydrocarbon group, and more preferably an aliphatic hydrocarbon group. Among the aliphatic hydrocarbon groups, an alkyl group and an alkenyl group are more preferable, and an alkyl group is still more preferable.

Examples of the monovalent halogenated hydrocarbon group of $X^{21}$ to $X^{23}$ include those exemplified as the monovalent halogenated hydrocarbon group of $X^{11}$ to $X^{13}$, and examples of the halogen atom also include those exemplified as the monovalent hydrocarbon group of $X^{11}$ to $X^{13}$.

At least one of $X^{21}$ to $X^{23}$ is a group represented by the general formula (2a). That is, one, two, or three of $X^{21}$ to $X^{23}$ may be a group represented by the general formula (2a), and preferably one of $X^{21}$ to $X^{23}$ is a group represented by the general formula (2a).

With respect to the group represented by the general formula (2a) of $X^{21}$ to $X^{23}$, examples of the divalent hydrocarbon of $R^{21}$ include a hydrocarbon group obtained by removing one hydrogen from the monovalent hydrocarbon group of $X^{21}$ to $X^{23}$. Therefore, examples of the divalent hydrocarbon of $R^{21}$ include a divalent aliphatic hydrocarbon group, an alicyclic hydrocarbon group, and an aromatic hydrocarbon group, an aliphatic hydrocarbon group and an alicyclic hydrocarbon group are preferable, and an aliphatic hydrocarbon group is more preferable.

As the divalent aliphatic hydrocarbon group, an alkylene group and an alkenylene group are preferable, and an alkylene group is more preferable. The number of carbon atoms in the alkylene group is preferably 1 or more, and the upper limit thereof is preferably 8 or less, more preferably 6 or less, still more preferably 4 or less, and even more preferably 2 or less. The number of carbon atoms in the alkenylene group is preferably 2 or more, and the upper limit thereof is the same as that of the alkylene group.

With respect to the group represented by the general formula (2a) of $X^{21}$ to $X^{23}$, examples of the monovalent hydrocarbon of $R^{22}$ include the same monovalent hydrocarbon groups as those of $X^{21}$ to $X^{23}$, that is, a monovalent aliphatic hydrocarbon group, an alicyclic hydrocarbon group, and an aromatic hydrocarbon group, and an aliphatic hydrocarbon group and an aromatic hydrocarbon group are preferable.

The aliphatic hydrocarbon group is preferably an alkyl group or an alkenyl group, more preferably an alkyl group, and the aliphatic hydrocarbon group may be either linear or branched. When the aliphatic hydrocarbon group is an alkyl group, the number of carbon atoms is preferably 1 or more, more preferably 2 or more, and still more preferably 4 or more, and the upper limit thereof is preferably 24 or less, more preferably 16 or less, still more preferably 12 or less, and even more preferably 10 or less.

The aromatic hydrocarbon group is preferably a phenyl group, a biphenyl group, a diphenylmethyl group, or a trityl group, more preferably a phenyl group, a diphenylmethyl group, or a trityl group, and still more preferably a phenyl group or a trityl group. These aromatic hydrocarbon groups may be substituted with a halogen atom, a hydroxy group, a monovalent aliphatic hydrocarbon group (an alkyl group or an alkenyl group), or the like.

Examples of the monovalent halogenated hydrocarbon of $R^{22}$ include a group in which a part of the monovalent hydrocarbon group of $R^{22}$ is substituted with a halogen atom. The halogen atom contained in the monovalent halogenated hydrocarbon of $R^{22}$ or the halogen atom of $R^{22}$ is preferably a fluorine atom, a chlorine atom, a bromine atom, or an iodine atom, more preferably a fluorine atom, a chlorine atom, or a bromine atom, and still more preferably a fluorine atom.

The epoxy compound 2 represented by the general formula (2) is preferably an epoxy compound in which $X^{21}$ is a group represented by the general formula (2a), $X^{22}$ and $X^{23}$ are each a hydrogen atom, and in the general formula (2a), $R^{21}$ is a divalent hydrocarbon group having 1 to 8 carbon atoms, and $R^{22}$ is a monovalent hydrocarbon group having 1 to 24 carbon atoms, and the divalent hydrocarbon group of $R^{21}$ and the monovalent hydrocarbon group of $R^{22}$ are as described above.

When the monovalent hydrocarbon group of $R^{22}$ is a phenyl group, it is preferably substituted with a monovalent aliphatic hydrocarbon group, and more preferably with an alkyl group. The number of carbon atoms in the alkyl group is preferably 1 or more, more preferably 2 or more, and still more preferably 4 or more, and the upper limit thereof is preferably 24 or less, more preferably 12 or less, still more preferably 8 or less, and even more preferably 6 or less. In this case, the aliphatic hydrocarbon group may be either linear or branched, and is preferably branched. Among these, $R^{22}$ is preferably an aliphatic hydrocarbon group having a quaternary carbon atom, and particularly preferably a tert-butyl group.

(Epoxy Compound 3)

The epoxy compound 3 is a compound represented by the following general formula (3).

(3)

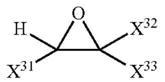

(3a)

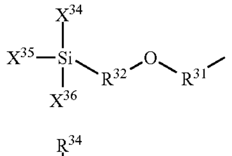

(3b)

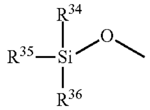

In the general formula (3), $X^{31}$ to $X^{33}$ are each independently a hydrogen atom, a halogen atom, a monovalent hydrocarbon group, a monovalent halogenated hydrocarbon group, or a group represented by the general formula (3a), and at least one of $X^{31}$ to $X^{33}$ is a group represented by the general formula (3a). In the general formula (3a), $R^{31}$ and $R^{32}$ are each independently a single bond or a divalent hydrocarbon group, and $X^{34}$ to $X^{36}$ are each independently a hydrogen atom, a halogen atom, a monovalent hydrocarbon group, a monovalent halogenated hydrocarbon group, $—OR^{33}$, or a group represented by the general formula (3b). $R^{33}$ to $R^{36}$ are each independently a hydrogen atom, a halogen atom, a monovalent hydrocarbon group, or a monovalent halogenated hydrocarbon group.

Examples of the monovalent hydrocarbon group of $X^{31}$ to $X^{33}$ include the same monovalent aliphatic hydrocarbon group, alicyclic hydrocarbon group, and aromatic hydrocarbon group as those exemplified as the monovalent hydrocarbon group of $X^{11}$ to $X^{13}$, and the monovalent hydrocarbon group is preferably an aliphatic hydrocarbon group or an alicyclic hydrocarbon group, and more preferably an aliphatic hydrocarbon group. Among the aliphatic hydrocarbon groups, an alkyl group and an alkenyl group are more preferable, and an alkyl group is still more preferable.

Examples of the monovalent halogenated hydrocarbon group of $X^{31}$ to $X^{33}$ include those exemplified as the monovalent halogenated hydrocarbon group of $X^{11}$ to $X^{13}$, and examples of the halogen atom also include those exemplified as the monovalent hydrocarbon group of $X^{11}$ to $X^{13}$.

At least one of $X^{31}$ to $X^{33}$ is a group represented by the general formula (3a). That is, one, two, or three of $X^{31}$ to $X^{33}$ may be a group represented by the general formula (3a), and preferably one of $X^{31}$ to $X^{33}$ is a group represented by the general formula (3a).

With respect to the group represented by the general formula (3a) of $X^{31}$ to $X^{33}$, examples of the divalent hydrocarbon of $R^{31}$ and $R^{32}$ include a hydrocarbon group obtained by removing one hydrogen from the monovalent hydrocarbon group of $X^{31}$ to $X^{33}$. Therefore, examples of the divalent hydrocarbon of $R^{31}$ include a divalent aliphatic hydrocarbon group, an alicyclic hydrocarbon group, and an aromatic hydrocarbon group, an aliphatic hydrocarbon group and an alicyclic hydrocarbon group are preferable, and an aliphatic hydrocarbon group is more preferable.

As the divalent aliphatic hydrocarbon group, an alkylene group and an alkenylene group are preferable, and an alkylene group is more preferable. The number of carbon atoms in the alkylene group is preferably 1 or more, and the upper limit thereof is preferably 8 or less, more preferably 6 or less, still more preferably 4 or less, and even more preferably 2 or less. The number of carbon atoms in the alkenylene group is preferably 2 or more, and the upper limit thereof is the same as that of the alkylene group.

Examples of the monovalent hydrocarbon group and the monovalent halogenated hydrocarbon group of $X^{34}$ to $X^{36}$ include the same groups as those exemplified as the monovalent hydrocarbon group and the halogenated hydrocarbon group of $X^{31}$ to $X^{33}$.

Examples of the monovalent hydrocarbon group and the monovalent halogenated hydrocarbon group of $R^{33}$ in $-OR^{33}$ of $X^{34}$ to $X^{36}$ and $R^{34}$ to $R^{36}$ of the general formula (3b) include the same groups as the monovalent hydrocarbon group and the monovalent halogenated hydrocarbon group of $X^{34}$ to $X^{36}$.

As the epoxy compound 3 represented by the general formula (3), it is preferable that $X^{31}$ is a group represented by the general formula (3a), $X^{32}$ and $X^{33}$ are each a hydrogen atom, in the general formula (3a), $R^{31}$ is a divalent hydrocarbon group having 1 to 8 carbon atoms, $R^{32}$ is a divalent hydrocarbon group having 1 to 8 carbon atoms, $X^{34}$ and $X^{36}$ are each a group represented by the general formula (3b), $X^{35}$ is a monovalent hydrocarbon group having 1 to 24 carbon atoms, and in the general formula (3b), $R^{34}$ to $R^{36}$ are each a monovalent hydrocarbon group having 1 to 24 carbon atoms.

In this case, the divalent hydrocarbon group of $R^{31}$ and $R^{32}$ is as described above, but the number of carbon atoms of the divalent hydrocarbon group of $R^{31}$ is preferably 1 or more, and the upper limit thereof is preferably 8 or less, more preferably 6 or less, still more preferably 4 or less, and even more preferably 2 or less. In addition, the number of carbon atoms of the divalent hydrocarbon group of $R^{32}$ is preferably 1 or more and more preferably 2 or more, and the upper limit thereof is preferably 8 or less, more preferably 6 or less, and still more preferably 4 or less. The monovalent hydrocarbon group of $X^{35}$, $R^{34}$ to $R^{36}$ is as described above, but the number of carbon atoms of the monovalent hydrocarbon group of $X^{35}$ is preferably 1 or more, and the upper limit thereof is preferably 24 or less, more preferably 12 or less, still more preferably 8 or less, even more preferably 4 or less, and particularly preferably 2 or less. Further, the number of carbon atoms of the monovalent hydrocarbon group of $R^{34}$ to $R^{36}$ is also the same as the number of carbon atoms of the monovalent hydrocarbon group of $X^{35}$.

In addition, as the epoxy compound 3 represented by the general formula (3), it is preferable that $X^{31}$ is a group represented by the general formula (3a), $X^{22}$ and $X^{23}$ are each a hydrogen atom, and in the general formula (3a), $R^{31}$ is a divalent hydrocarbon group having 1 to 8 carbon atoms, $R^{32}$ is a single bond, and $X^{34}$ to $X^{36}$ are each a monovalent hydrocarbon group having 1 to 24 carbon atoms.

In this case, the divalent hydrocarbon group of $R^{31}$ is as described above, but the number of carbon atoms of the divalent hydrocarbon group of $R^{31}$ is preferably 1 or more, and the upper limit thereof is preferably 8 or less, more preferably 6 or less, still more preferably 4 or less, and even more preferably 2 or less. The monovalent hydrocarbon group of $X^{34}$ to $X^{36}$ is as described above, but the number of carbon atoms of the monovalent hydrocarbon group of $X^{34}$ and $X^{36}$ is preferably 1 or more, and the upper limit thereof is preferably 24 or less, more preferably 12 or less, still more preferably 8 or less, even more preferably 4 or less, and particularly preferably 2 or less. The number of carbon atoms of the monovalent hydrocarbon group of $X^{35}$ is preferably 1 or more, more preferably 2 or more, and still more preferably 4 or more, and the upper limit thereof is preferably 24 or less, more preferably 12 or less, still more preferably 8 or less, and even more preferably 6 or less. In this case, the hydrocarbon group of $X^{35}$ may be either linear or branched, and is preferably branched. An aliphatic hydrocarbon group having a quaternary carbon atom is preferable, and a tert-butyl group is particularly preferable.

The molecular weight of the epoxy compound contained in the modified sulfide solid electrolyte of the present embodiment is preferably 60 or more, and more preferably 70 or more, and the upper limit thereof is preferably 400 or less, more preferably 380 or less, and still more preferably 350 or less. When an epoxy compound having such a molecular weight is used, coating suitability can be efficiently improved.

The content of the epoxy compound varies depending on the type of the epoxy compound to be used, and thus cannot be determined unconditionally, but the content is preferably 0.03 parts by mass or more, more preferably 0.05 parts by mass, still more preferably 0.1 parts by mass or more, and even more preferably 0.5 parts by mass with respect to 100 parts by mass of the sulfide solid electrolyte, and the upper limit thereof is preferably 25 parts by mass or less, and more preferably 20 parts by mass or less. By using the epoxy compound in such a content, coating suitability can be efficiently improved.

(Production of Sulfide Solid Electrolyte)

Next, the sulfide solid electrolyte forming the modified sulfide solid electrolyte of the present embodiment will be described. The sulfide solid electrolytes that can be used in the present embodiment are not particularly limited as long as they contain a lithium atom, a sulfur atom, a phosphorus atom, and a halogen atom and have a BET specific surface area of 10 $m^2/g$ or more. As the sulfide solid electrolyte, a commercially available product may be used, or a product produced by the method of the sulfide solid electrolyte described below can be used.

In a case where the sulfide solid electrolyte that can be used in the present embodiment is produced and used, a production method thereof will be described. The sulfide solid electrolyte that can be used in the present embodiment is obtained by, for example, a production method including mixing two or more raw materials selected from compounds containing at least one atom of a lithium atom, a sulfur atom, a phosphorus atom, and a halogen atom.

(Raw Material)

As the raw material, two or more compounds selected from compounds containing at least one atom of a lithium atom, a sulfur atom, a phosphorus atom, and a halogen atom can be adopted.

The compound that can be used as a raw material contains at least one atom of a lithium atom, a sulfur atom, a phosphorus atom, and a halogen atom, and more specifically, typical examples thereof include raw materials consisting of at least two kinds of atoms selected from the above four kinds of atoms, such as lithium sulfide; lithium halides such as lithium fluoride, lithium chloride, lithium bromide, and lithium iodide; alkali metal halides such as sodium halides such as sodium iodide, sodium fluoride, sodium chloride, and sodium bromide; phosphorus sulfides such as diphosphorus trisulfide ($P_2S_3$) and diphosphorus pentasulfide ($P_2S_5$); phosphorus halides such as various phosphorus fluorides ($PF_3$ and $PF_5$), various phosphorus chlorides ($PCl_3$, $PCl_5$, and $P_2Cl_4$), various phosphorus bromides ($PBr_3$ and $PBr_5$), and various phosphorus iodides ($PI_3$ and $P_2I_4$); and thiophosphoryl halides such as thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichloride fluoride ($PSCl_2F$), and thiophosphoryl dibromide fluoride ($PSBr_2F$); and halogen simple substances such as fluorine ($F_2$), chlorine ($Cl_2$), bromine ($Br_2$), and iodine ($I_2$), preferably bromine ($Br_2$) and iodine ($I_2$).

Examples of compounds that can be used as raw materials other than the above include compounds containing at least one kind of atom selected from the above four kinds of atoms and containing one or more atoms other than the four kinds of atoms, more specifically, lithium compounds such as lithium oxide, lithium hydroxide, and lithium carbonate; alkali metal sulfides such as sodium sulfide, potassium sulfide, rubidium sulfide, and cesium sulfide; metal sulfides such as silicon sulfide, germanium sulfide, boron sulfide, gallium sulfide, tin sulfide (SnS, $SnS_2$), aluminum sulfide, and zinc sulfide; phosphoric acid compounds such as sodium phosphate and lithium phosphate; metal halides such as an aluminum halide, a silicon halide, a germanium halide, an arsenic halide, a selenium halide, a tin halide, an antimony halide, a tellurium halide, and a bismuth halide; and phosphorus oxyhalides such as phosphorus oxychloride ($POCl_3$) and phosphorus oxybromide ($POBr_3$).

In the present embodiment, from the viewpoint of more easily obtaining a sulfide solid electrolyte having high ion conductivity, among halogen atoms, a chlorine atom, a bromine atom, and an iodine atom are preferable, and a bromine atom and an iodine atom are more preferable. These atoms may be used alone or in combination of a plurality of kinds thereof. That is, taking a lithium halide as an example, lithium bromide may be used alone, lithium iodide may be used alone, or lithium bromide and lithium iodide may be used in combination.

In addition, from the same viewpoint, as the compound that can be used as a raw material, among the above, lithium sulfide; phosphorus sulfides such as diphosphorus trisulfide ($P_2S_3$) and diphosphorus pentasulfide ($P_2S_5$); halogen simple substances such as fluorine ($F_2$), chlorine ($Cl_2$), bromine ($Br_2$), and iodine ($I_2$); and lithium halides such as lithium fluoride, lithium chloride, lithium bromide, and lithium iodide are preferable; among phosphorus sulfides, diphosphorus pentasulfide is preferable; among halogen simple substances, chlorine ($Cl_2$), bromine ($Br_2$), and iodine ($I_2$) are preferable; and among lithium halides, lithium chloride, lithium bromide, and lithium iodide are preferable.

As a combination of compounds that can be used as raw materials, for example, a combination of lithium sulfide, diphosphorus pentasulfide and a lithium halide, and a combination of lithium sulfide, diphosphorus pentasulfide and a halogen simple substance are preferable. As the lithium halide, lithium bromide, lithium iodide, and lithium chloride are preferable, and as the halogen simple substance, chlorine, bromine, and iodine are preferable.

In a case where lithium sulfide is used as the compound containing a lithium atom in the present embodiment, it is preferable that the lithium sulfide is in the form of particles.

The average particle diameter ($D_{50}$) of the lithium sulfide particles is preferably 10 μm or more and 2000 μm or less, more preferably 30 μm or more and 1500 μm or less, and still more preferably 50 μm or more and 1000 μm or less. In the description herein, the average particle diameter ($D_{50}$) is the particle diameter at which 50% of the total particle diameter is reached by sequentially integrating from the smallest particle when a particle size distribution integration curve is drawn, and the volume distribution is the average particle diameter that can be measured using, for example, a laser diffraction/scattering particle size distribution measuring apparatus. In addition, among the raw materials exemplified above, the solid raw material preferably has an average particle diameter similar to that of the lithium sulfide particles, that is, the average particle diameter of the solid raw material is preferably within the same range as the average particle diameter of the lithium sulfide particles.

When lithium sulfide, diphosphorus pentasulfide, and a lithium halide are used as raw materials, the proportion of lithium sulfide to the total of lithium sulfide and diphosphorus pentasulfide is preferably 60 mol % or more, more preferably 65 mol % or more, and still more preferably 68 mol % or more, and the upper limit thereof is preferably 80 mol % or less, more preferably 78 mol % or less, and still more preferably 76 mol % or less, from the viewpoint of obtaining higher chemical stability and from the viewpoint of improving the $PS_4$ fraction and obtaining high ion conductivity.

When lithium sulfide, diphosphorus pentasulfide, a lithium halide, and other raw materials used as necessary are used, the content of lithium sulfide and diphosphorus pentasulfide with respect to the total thereof is preferably 60 mol % or more, more preferably 65 mol % or more, and still more preferably 70 mol % or more, and the upper limit thereof is preferably 100 mol % or less, more preferably 90 mol % or less, and still more preferably 80 mol % or less.

In addition, when lithium bromide and lithium iodide are used in combination as the lithium halide, the proportion of lithium bromide to the total of lithium bromide and lithium iodide is preferably 1 mol % or more, more preferably 20 mol % or more, still more preferably 40 mol % or more, and even more preferably 50 mol % or more, and the upper limit thereof is preferably 99 mol % or less, more preferably 90 mol % or less, still more preferably 80 mol % or less, and even more preferably 70 mol % or less, from the viewpoint of improving the $PS_4$ fraction and obtaining high ion conductivity.

When a halogen simple substance is used as a raw material and lithium sulfide or diphosphorus pentasulfide is used, the proportion of the number of moles of lithium sulfide excluding lithium sulfide having the same number of moles as the halogen simple substance to the total number of moles of lithium sulfide excluding lithium sulfide having the same number of moles as the halogen simple substance and diphosphorus pentasulfide is preferably in the range of 60 to 90%, more preferably in the range of 65 to 85%, still more preferably in the range of 68 to 82%, even more preferably in the range of 72 to 78%, and particularly preferably in the range of 73 to 77%. This is because a higher ion conductivity can be obtained at these proportions. In addition, from the same viewpoint, when lithium sulfide, diphosphorus pentasulfide, and a halogen single substance are used, the content of the halogen single substance with respect to the total amount of lithium sulfide, diphosphorus pentasulfide, and the halogen single substance is preferably 1 to 50 mol %, more preferably 2 to 40 mol %, still more preferably 3 to 25 mol %, and even more preferably 3 to 15 mol %.

When lithium sulfide, diphosphorus pentasulfide, a halogen simple substance, and a lithium halide are used, the content (a mol %) of the halogen simple substance and the content (8 mol %) of the lithium halide with respect to the total amount thereof preferably satisfy the following formula (1), more preferably satisfy the following formula (2), still more preferably satisfy the following formula (3), and even more preferably satisfy the following formula (4).

$$2 \leq 2\alpha+\beta \leq 100 \quad (1)$$

$$4 \leq 2\alpha+\beta \leq 80 \quad (2)$$

$$6 \leq 2\alpha+\beta \leq 50 \quad (3)$$

$$6 \leq 2\alpha+\beta \leq 30 \quad (4)$$

(Mixing)

Mixing of two or more kinds of raw materials selected from compounds containing at least one atom of a lithium atom, a sulfur atom, a phosphorus atom, and a halogen atom can be carried out, for example, by using a mixer. It can also be performed by using a stirrer, a pulverizer, or the like.

This is because mixing of the raw materials can occur even when a stirrer is used, and when a pulverizer is used, pulverization of the raw materials occurs, but mixing also occurs at the same time. That is, it can be said that the sulfide solid electrolyte used in the present embodiment can be obtained by stirring, mixing, pulverization, or a combination thereof two or more kinds of raw materials selected from compounds containing at least one atom of a lithium atom, a sulfur atom, a phosphorus atom, and a halogen atom.

Examples of the stirrer and the mixer include a mechanical stirring type mixer provided with a stirring blade in a reaction tank and capable of stirring (which may also be referred to as mixing by stirring or stirring and mixing). Examples of the mechanical stirring type mixer include a high-speed stirring type mixer and a double-arm type mixer. Further, examples of the high-speed stirring type mixer include a vertical shaft rotation type mixer and a horizontal shaft rotation type mixer, and either type of mixer may be used.

Examples of the shape of the stirring blade used in the mechanical stirring type mixer include a blade type, an arm type, an anchor type, a paddle type, a full-zone type, a ribbon type, a multi-stage blade type, a double-arm type, a shovel type, a twin-screw blade type, a flat blade type, and a C-type blade type. From the viewpoint of more efficiently promoting the reaction of raw materials, a shovel type, a flat blade type, a C-type blade type, an anchor type, a paddle type, and a full-zone type are preferable, and an anchor type, a paddle type, and a full-zone type are more preferable.

In a case where a mechanical stirring type mixer is used, the rotation speed of the stirring blade may be appropriately adjusted according to the volume and temperature of the fluid in the reaction tank, the shape of the stirring blade, and the like, and is not particularly limited, but is usually about 5 rpm or more and 400 rpm or less, and from the viewpoint of more efficiently promoting the reaction of the raw materials, the rotation speed is preferably 10 rpm or more and 300 rpm or less, more preferably 15 rpm or more and 250 rpm or less, and still more preferably 20 rpm or more and 200 rpm or less.

The temperature condition at the time of mixing using a mixer is not particularly limited, and is, for example, usually −30 to 120° C., preferably −10 to 100° C., more preferably 0 to 80° C., and still more preferably 10 to 60° C. In addition, the mixing time is usually 0.1 to 500 hours, and is preferably 1 to 450 hours, more preferably 10 to 425 hours, still more preferably 20 to 400 hours, and even more preferably 40 to 375 hours from the viewpoint of making the dispersion state of the raw materials more uniform and promoting the reaction.

The method of performing mixing accompanied by pulverization using a pulverizer is a method which has been conventionally adopted as a solid phase method (mechanical milling method). As the pulverizer, for example, a media type mill using a pulverization medium can be used.

The media type mill is roughly classified into a container driving-type mill and a media agitating-type mill. Examples of the container driving-type mill include a ball mill and a bead mill including a stirring tank, a pulverization tank, or a combination thereof. Examples of the media agitating-type mill include various pulverizers such as an impact type pulverizer such as a cutter mill, a hammer mill, and a pin mill; a tower type pulverizer such as a tower mill; a stirring tank type pulverizer such as an attritor, an aquaizer, and a sand grinder; a flow tank type pulverizer such as a visco mill and a pearl mill; a flow tube type pulverizer; an annular type pulverizer such as a Co-ball mill; a continuous dynamic type pulverizer; and a single-shaft or multi-shaft kneader. Among these, a ball mill and a bead mill exemplified as the container driving-type mill are preferable in consideration of ease of adjustment of the particle size of the obtained sulfide, and among these, a planetary type mill is preferable.

These pulverizers can be appropriately selected according to the desired scale and the like, and if they are relatively small-scale, the container driving-type mills such as a ball mill and a bead mill can be used, and in the case of large-scale or mass production, other types of pulverizers may be used.

Further, as will be described later, in the case of a liquid state accompanied by a liquid such as a solvent at the time of mixing or a slurry state, a wet pulverizer capable of corresponding to wet pulverization is preferable.

Representative examples of the wet pulverizer include a wet bead mill, a wet ball mill, and a wet vibration mill, and a wet bead mill using beads as pulverization media is preferable from the viewpoint that the conditions of the pulverization operation can be freely adjusted and it is easy to correspond to those having a smaller particle diameter. Further, it is also possible to use a dry pulverizer such as a dry media type mill such as a dry bead mill, a dry ball mill, or a dry vibration mill, or a dry non-media type mill such as a jet mill.

In addition, in a case where an object to be mixed is in a liquid state or a slurry state, it is also possible to use a circulation type pulverizer capable of performing a circulating operation for circulation as necessary. Specific examples thereof include a pulverizer having a form in which a slurry is circulated between a pulverizer (pulverization mixer) for pulverizing the slurry and a temperature holding tank (reactor container).

The size of the beads and balls used in the ball mill and the bead mill may be appropriately selected according to the desired particle size, the processing amount, and the like, and for example, the diameter of the beads is usually 0.05 mmφ or more, preferably 0.1 mmφ or more, and more preferably 0.3 mmφ or more, and the upper limit thereof is usually 5.0 mmφ or less, preferably 3.0 mmφ or less, and more preferably 2.0 mmφ or less. The diameter of the ball is usually 2.0 mmφ or more, preferably 2.5 mmφ or more, and more preferably 3.0 mmφ or more, and the upper limit thereof is usually 20.0 mmφ or less, preferably 15.0 mmφ or less, and more preferably 10.0 mmφ or less.

Examples of the material include metals such as stainless steel, chrome steel, and tungsten carbide; ceramics such as zirconia and silicon nitride; and minerals such as agate.

In addition, in a case where a ball mill or a beads mill is used, the rotation speed is usually 10 rpm or more, preferably 20 rpm or more, and more preferably 50 rpm or more, and the upper limit thereof is usually 1,000 rpm or less, preferably 900 rpm or less, more preferably 800 rpm or less, and still more preferably 700 rpm or less, although it cannot be determined unconditionally because the rotation speed varies depending on the scale of the treatment.

The pulverization time in this case varies depending on the scale of the treatment, and thus cannot be determined unconditionally, but is usually 0.5 hours or more, preferably 1 hour or more, more preferably 5 hours or more, and still more preferably 10 hours or more, and the upper limit thereof is usually 100 hours or less, preferably 72 hours or less, more preferably 48 hours or less, and still more preferably 36 hours or less.

By selecting the size and material of the medium (beads or balls) to be used, the rotation speed of the rotor, the time, and the like, mixing, stirring, pulverization, or a treatment combining any of these can be performed, and the particle diameter and the like of the sulfide to be obtained can be adjusted.

(Solvent)

In the above mixing, a solvent can be added to the above raw materials. As the solvent, various solvents widely referred to as organic solvents can be used.

As the solvent, a wide variety of solvents conventionally used in the production of solid electrolytes can be used, and examples thereof include hydrocarbon solvents such as an aliphatic hydrocarbon solvent, an alicyclic hydrocarbon solvent, and an aromatic hydrocarbon solvent.

Examples of the aliphatic hydrocarbon include hexane, pentane, 2-ethylhexane, heptane, octane, decane, undecane, dodecane, and tridecane; examples of the alicyclic hydrocarbon include cyclohexane and methylcyclohexane; and examples of the aromatic hydrocarbon solvent include benzene, toluene, xylene, mesitylene, ethylbenzene, tert-butylbenzene, trifluoromethylbenzene, and nitrobenzene.

In addition to the above-described hydrocarbon solvents, solvents containing an atom other than a carbon atom and a hydrogen atom, for example, a heteroatom such as a nitrogen atom, an oxygen atom, a sulfur atom, and a halogen atom are also exemplified. Such a solvent has a property of easily forming a complex with a compound or the like containing a lithium atom, a phosphorus atom, a sulfur atom, and a halogen atom used as a raw material (hereinafter, such a solvent is also referred to as a "complexing agent"), and has a property of easily retaining a halogen atom in the structure of the sulfide solid electrolyte, and thus is useful in that higher ion conductivity is obtained. Preferred examples of such a complexing agent include an alcohol solvent, an aldehyde solvent, and a ketone solvent, as well as an ether solvent and an ester solvent, each of which has an oxygen atom as a hetero atom.

Preferred examples of the ether solvent include aliphatic ethers such as dimethyl ether, diethyl ether, tert-butyl methyl ether, dimethoxymethane, dimethoxyethane, diethylene glycol dimethyl ether (diglyme), triethylene oxide glycol dimethyl ether (triglyme), diethylene glycol, and triethylene glycol; alicyclic ethers such as ethylene oxide, propylene oxide, tetrahydrofuran, tetrahydropyran, dimethoxytetrahydrofuran, cyclopentyl methyl ether, and dioxane; heterocyclic ethers such as furan, benzofuran, and benzopyran; and aromatic ethers such as methyl phenyl ether (anisole), ethyl phenyl ether, clibenzyl ether, and diphenyl ether.

Preferred examples of the ester solvent include aliphatic esters such as methyl formate, ethyl formate, methyl acetate, ethyl acetate, propyl acetate, and isopropyl acetate; aliphatic esters such as methyl propionate, ethyl propionate, dimethyl oxalate, diethyl oxalate, dimethyl malonate, diethyl malonate, dimethyl succinate, and diethyl succinate; alicyclic esters such as methyl cyclohexanecarboxylate, ethyl cyclohexanecarboxylate, and dimethyl cyclohexaneclicarboxylate; heterocyclic esters such as methyl pyridinecarboxylate, methyl pyrimiclinecarboxylate, acetolactone, propiolactone, butyrolactone, and valerolactone; and aromatic esters such as methyl benzoate, ethyl benzoate, dimethyl phthalate, diethyl phthalate, butylbenzyl phthalate, clicyclohexyl phthalate, trimethyl trimellitate, and triethyl trimellitate.

In addition, alcohol solvents such as ethanol and butanol; aldehyde solvents such as formaldehyde, acetaldehyde, and dimethylformamide; ketone solvents such as acetone and methyl ethyl ketone; and the like are preferably exemplified.

Examples of the solvent containing a nitrogen atom as a hetero atom include solvents having a group containing a nitrogen atom, such as an amino group, an amido group, a nitro group, and a nitrile group.

For example, preferred examples of the solvent having an amino group include aliphatic amines such as ethylenediamine, cliaminopropane, dimethylethylenecliamine, diethylethylenecliamine, climethykliaminopropane, tetramethyldiaminomethane, tetramethylethylenecliamine (TMEDA), and tetramethykliaminopropane (TMPDA); alicyclic amines such as cyclopropanediamine, cyclohexanediamine, and bisaminomethylcyclohexane; heterocyclic amines such as isophoronecliamine, piperazine, clipiperidylpropane, and climethylpiperazine; and aromatic amines such as phenykliamine, tolylenediamine, naphthalenediamine, methylphenylenediamine, dimethylnaphthalenecliamine, dimethylphenylenediamine, tetramethylphenylenediamine, and tetramethylnaphthalenediamine.

Nitrile solvents such as acetonitrile and acrylonitrile; and solvents containing a nitrogen atom, such as dimethylformamide and nitrobenzene are also preferably exemplified.

Preferred examples of the solvent containing a halogen atom as a hetero atom include dichloromethane, chlorobenzene, trifluoromethylbenzene, chlorobenzene, chlorotoluene, and bromobenzene.

Preferred examples of the solvent containing a sulfur atom include dimethyl sulfoxide and carbon disulfide.

When the solvent is used, the amount of the solvent used is preferably 100 mL or more, more preferably 200 mL or more, still more preferably 250 mL or more, and even more preferably 300 mL or more, and the upper limit thereof is preferably 3000 mL or less, more preferably 2500 mL or less, still more preferably 2000 mL or less, and even more preferably 1550 mL or less with respect to 1 kg of the total amount of raw materials. When the amount of the solvent used is within the above range, the raw materials can be efficiently reacted.

(Drying)

When the mixing is performed using a solvent, it may include performing the mixing and then drying the fluid (usually a slurry) obtained by the mixing. When a complexing agent is used as the solvent, the sulfide solid electrolyte can be obtained by removing the complexing agent from the complex containing the complexing agent, when the complexing agent and the solvent are used in combination, by removing the complexing agent from the complex containing the complexing agent and removing the solvent, and when a solvent other than the complexing agent is used, by removing the solvent. The obtained sulfide solid electrolyte exhibits ion conductivity caused by lithium atoms.

The drying can be performed at a temperature corresponding to the type of the solvent on the fluid obtained by mixing. For example, the drying can be performed at a temperature equal to or higher than the boiling point of the complexing agent.

The drying can be performed by drying under reduced pressure (vacuum drying) at about 5 to 100° C., preferably 10 to 85° C., more preferably 15 to 70° C., and still more preferably at about room temperature (23° C.) (for example, room temperature ±about 5° C.) using vacuum pumps or the like to volatilize the complexing agent and solvents used as necessary.

The drying may be performed by filtration of the fluid using a glass filter or the like, solid-liquid separation by decantation, or solid-liquid separation using a centrifugal separator or the like. When a solvent other than the complexing agent is used, the sulfide solid electrolyte is obtained by solid-liquid separation. When a complexing agent is used as the solvent, solid-liquid separation is performed, and then drying may be performed under the above temperature conditions to remove the complexing agent incorporated into the complex.

In the solid-liquid separation, to be specific, decantation for removing a complexing agent and a solvent which become a supernatant after transferring a fluid to a container and precipitating a sulfide (or a complex (which can also be referred to as a precursor of a sulfide solid electrolyte) in a case where a complexing agent is contained)), or filtration using a glass filter having a pore size of, for example, about 10 to 200 μm, preferably 20 to 150 μm is easy.

The drying may be performed after the mixing and before the hydrogen treatment to be described later, or may be performed after the hydrogen treatment is performed.

The sulfide solid electrolyte obtained by performing the mixing described above, or in a case where a solvent is used, the sulfide solid electrolyte obtained by removing the solvent by the drying described above exhibits ion conductivity caused by lithium atoms.

The sulfide solid electrolyte obtained by performing the mixing is basically an amorphous sulfide solid electrolyte (glass component) unless, for example, mixing by pulverization using a pulverizer is performed to such an extent that crystallization occurs.

The sulfide solid electrolyte obtained by performing the mixing may be an amorphous sulfide solid electrolyte (glass component) or a crystalline sulfide solid electrolyte, and can be appropriately selected as desired. In the case of producing a crystalline sulfide solid electrolyte, the crystalline sulfide solid electrolyte can be obtained by heating the amorphous sulfide solid electrolyte obtained by the mixing.

The sulfide solid electrolyte may also include a crystalline sulfide solid electrolyte in which an amorphous component (glass component) is formed on the surface of the crystalline sulfide solid electrolyte as a result of performing a treatment such as pulverization, which will be described later, for example, in order to adjust the particle size of the crystalline sulfide solid electrolyte powder. Therefore, the sulfide solid electrolyte containing an amorphous component also includes an amorphous sulfide solid electrolyte and a sulfide solid electrolyte which is a crystalline sulfide solid electrolyte and in which an amorphous component is formed on the surface thereof.

(Heating)

When a crystalline sulfide solid electrolyte is produced, the method may further include heating. In the case where an amorphous sulfide solid electrolyte (glass component) is obtained by performing the mixing as described above, a crystalline sulfide solid electrolyte is obtained by heating, and in the case where a crystalline sulfide solid electrolyte is obtained, a crystalline sulfide solid electrolyte having further improved crystallinity is obtained.

In addition, when a complexing agent is used as a solvent at the time of performing mixing, a complex containing the complexing agent is formed, but by heating without performing the drying described above, the complexing agent is removed from the complex, and a sulfide solid electrolyte is obtained, and depending on the heating conditions, an amorphous solid electrolyte or a crystalline solid electrolyte can be obtained.

For example, the heating temperature for obtaining the amorphous sulfide solid electrolyte may be determined according to the structure of the crystalline sulfide solid electrolyte obtained by heating the amorphous sulfide solid electrolyte. To be specific, when the amorphous sulfide solid electrolyte is subjected to differential thermal analysis (DTA) using a differential thermal analyzer (DTA apparatus) at a heating rate of 10° C./min, the heating temperature is preferably 5° C. or lower, more preferably 10° C. or lower, and still more preferably 20° C. or lower, based on the peak top temperature of the exothermic peak observed on the lowest temperature side. The lower limit is not particularly limited and may be about −40° C. or higher of the peak top temperature of the exothermic peak observed on the lowest temperature side. By setting the temperature in such a range, an amorphous sulfide solid electrolyte can be obtained more efficiently and reliably. The heating temperature for obtaining the amorphous sulfide solid electrolyte varies depending on the structure of the obtained crystalline sulfide solid electrolyte and thus cannot be defined unconditionally, but is usually preferably 135° C. or lower, more preferably 130° C. or lower, and still more preferably 125° C. or lower, and the lower limit thereof is not particularly limited, but is preferably 90° C. or higher, more preferably 100° C. or higher, and still more preferably 105° C. or higher.

When the amorphous sulfide solid electrolyte is heated to obtain the crystalline sulfide solid electrolyte, the heating temperature may be determined according to the structure of the crystalline sulfide solid electrolyte, and is preferably higher than the above-described heating temperature for obtaining the amorphous sulfide solid electrolyte. To be specific, when the amorphous sulfide solid electrolyte is subjected to differential thermal analysis (DTA) using a differential thermal analyzer (DTA apparatus) at a heating rate of 10° C./min, the heating temperature is preferably 5° C. or higher, more preferably 10° C. or higher, and still more preferably 20° C. or higher, and the upper limit is not particularly limited and may be about 40° C. or lower, based on the peak top temperature of the exothermic peak observed on the lowest temperature side. By setting the temperature in such a range, a crystalline sulfide solid electrolyte can be obtained more efficiently and reliably. The heating temperature for obtaining the crystalline sulfide solid electrolyte varies depending on the composition and structure of the obtained crystalline sulfide solid electrolyte, and thus cannot be defined unconditionally, but is usually preferably 130° C. or higher, more preferably 135° C. or higher, and still more preferably 140° C. or higher, and the upper limit thereof is not particularly limited, but is preferably 600° C. or lower, more preferably 550° C. or lower, and still more preferably 500° C. or lower.

The heating time is not particularly limited as long as a desired amorphous sulfide solid electrolyte and crystalline sulfide solid electrolyte can be obtained. For example, the heating time is preferably 1 minute or more, more preferably 10 minutes or more, still more preferably 30 minutes or more, and even more preferably 1 hour or more. The upper limit of the heating time is not particularly limited, but is preferably 24 hours or less, more preferably 10 hours or less, still more preferably 5 hours or less, and even more preferably 3 hours or less.

Further, the heating is preferably performed in an inert gas atmosphere (for example, a nitrogen atmosphere or an argon atmosphere) or a reduced pressure atmosphere (in particular, a vacuum). An inert gas atmosphere containing hydrogen having a constant concentration, for example, a concentration of hydrogen in a hydrogen treatment described later may be used. This is because deterioration (for example, oxidation) of the crystalline sulfide solid electrolyte can be prevented.

The heating method is not particularly limited, and examples thereof include a method using a hot plate, a vacuum heating apparatus, an argon gas atmosphere furnace, and a firing furnace. In addition, industrially, a horizontal dryer having a heating means and a feed mechanism, a horizontal vibration flow dryer, or the like can be used, and may be selected according to the amount of treatment to be heated.

(Sulfide Solid Electrolyte)

As described above, the sulfide solid electrolyte used in the present embodiment may be a commercially available product or a manufactured product.

The sulfide solid electrolyte obtained by the above-described method is an amorphous (glass component) or crystalline sulfide solid electrolyte containing a lithium atom, a sulfur atom, a phosphorus atom, and a halogen atom, and is suitably used as the sulfide solid electrolyte in the present embodiment.

(BET Specific Surface Area)

The specific surface area of the sulfide solid electrolyte used in the present embodiment has a BET specific surface area of 10 $m^2/g$ or more. Although the modified sulfide solid electrolyte of the present embodiment has such a large specific surface area, the modified sulfide solid electrolyte of the present embodiment is excellent in coating suitability when coated as a paste, and exhibits an effect of efficiently exhibiting excellent battery performance. The higher the BET specific surface area of the sulfide solid electrolyte is, the more superiority of the effect can be exhibited. From such a viewpoint, the BET specific surface area is preferably 12 $m^2/g$ or more, more preferably 15 $m^2/g$ or more, and still more preferably 20 $m^2/g$ or more. From the same viewpoint, the upper limit thereof is not particularly limited, but is practically 100 $m^2/g$ or less, preferably 75 $m^2/g$ or less, and more preferably 50 $m^2/g$ or less.

In the description herein, the BET specific surface area is a specific surface area measured in accordance with JIS Z 8830:2013 (Determination of the specific surface area of powders (solids) by gas adsorption-BET method) using krypton as an adsorbate.

(Amorphous Sulfide Solid Electrolyte)

The amorphous sulfide solid electrolyte obtained by the above method contains a lithium atom, a sulfur atom, a phosphorus atom, and a halogen atom, and typical examples thereof include solid electrolytes composed of lithium sulfide, phosphorus sulfide, and a lithium halide, such as $Li_2S—P_2S_5—LiI$, $Li_2S—P_2S_5—LiCl$, $Li_2S—P_2S_5—LiBr$, and $Li_2S—P_2S_5—LiI—LiBr$; and solid electrolytes further containing other atoms such as an oxygen atom and a silicon atom, such as $Li_2S—P_2S_5—Li_2O—LiI$ and $Li_2S—SiS_2—P_2S_5—LiI$. From the viewpoint of obtaining higher ion conductivity, solid electrolytes composed of lithium sulfide, phosphorus sulfide, and a lithium halide, such as $Li_2S—P_2S_5—LiI$, $Li_2S—P_2S_5—LiCl$, $Li_2S—P_2S_5—LiBr$, and $Li_2S—P_2S_5—LiI—LiBr$, are preferably exemplified.

The types of atoms constituting the amorphous sulfide solid electrolyte can be confirmed by, for example, an ICP emission spectrophotometer.

The shape of the amorphous sulfide solid electrolyte is not particularly limited, and examples thereof include a particulate shape. The average particle diameter ($D_{50}$) of the particulate amorphous sulfide solid electrolyte can be, for example, in the range of 0.01 μm to 500 μm and 0.1 μm to 200 μm.

(Crystalline Sulfide Solid Electrolyte)

The crystalline sulfide solid electrolyte obtained by the above method may be a so-called glass ceramic obtained by heating an amorphous solid electrolyte to a crystallization temperature or higher, and examples of the crystal structure include a $Li_3PS_4$ crystal structure, a $Li_4P_2S_6$ crystal structure, a $Li_7PS_6$ crystal structure, a $Li_7P_3S_{11}$ crystal structure, and a crystal structure having peaks in the vicinity of 2θ=20.2° and in the vicinity of 23.6° (for example, JP 2013-16423 A).

In addition, sulfide solid electrolytes having a crystal structure such as a $Li_{4-x}Ge_{1-x}P_xS_4$ thio-LISICON Region II type crystal structure (see Kanno et al., Journal of The Electrochemical Society, 148 (7) A742-746 (2001)), a crystal structure similar to a $Li_{4-x}Ge_{1-x}P_xS_4$ thio-LISICON Region II type crystal structure (see Solid State Ionics, 177 (2006), 2721-2725), and the like can also be mentioned. The crystal structure of the crystalline sulfide solid electrolyte obtained by the production method of the present embodiment is preferably a thio-LISICON Region II type crystal structure among the above from the viewpoint that higher ion conductivity is obtained. Here, the "thio-LISICON Region II type crystal structure" indicates any one of a $Li_{4-x}Ge_{1-x}P_xS_4$thio-LISICON Region II type crystal structure and a crystal structure similar to a $Li_{4-x}Ge_{1-x}P_xS_4$ thio-LISICON Region II type crystal structure. Further, the crystalline sulfide solid electrolyte obtained by the production method of the present embodiment may have the above-described thio-LISICON region II type crystal structure or may have it as a main crystal, but from the viewpoint of obtaining a higher ion conductivity, it is preferable that the crystalline sulfide solid electrolyte has it as a main crystal. In the description herein, the expression "having as a main crystal" means that the proportion of a target crystal structure in the crystal structure is 80% or more, and is preferably 90% or more and more preferably 95% or more. In addition, from the viewpoint of obtaining higher ion conductivity, it is preferable that the crystalline sulfide solid electrolytes obtained by the production method of the present embodiment do not contain crystalline $Li_3PS_4$ (β-$Li_3PS_4$).

In X-ray diffraction measurement using CuKα rays, diffraction peaks of the $Li_3PS_4$ crystal structure appear, for example, at around 2θ=17.5°, 18.3°, 26.1°, 27.3°, and 30.0°, diffraction peaks of the $Li_4P_2S_6$ crystal structure appear, for example, at around 2θ=16.9°, 27.1°, and 32.5°, diffraction peaks of the $Li_7PS_6$ crystal structure appear, for example, at around 2θ=15.3°, 25.2°, 29.6°, and 31.0°, diffraction peaks of the $Li_7P_3S_{11}$ crystal structure appear, for example, at around 2θ=17.8°, 18.5°, 19.7°, 21.8°, 23.7°, 25.9°, 29.6°, and 30.0°, diffraction peaks of the $Li_{4-x}Ge_{1-x}P_xS_4$ thio-LISICON Region II type crystal structure appear, for example, at around 2θ=20.1°, 23.9°, and 29.5°, and diffraction peaks of a crystal structure similar to the $Li_{4-x}Ge_{1-x}P_xS_4$ thio-LISICON Region II type crystal structure appear, for example, at around 2θ=20.2° and 23.6°. In addition, these peak positions may be shifted within a range of ±0.5°.

As described above, when the thio-LISICON Region II type crystal structure is obtained in the present embodiment, it is preferable that the crystalline $Li_3PS_4$ (β-$Li_3PS_4$) is not contained. The sulfide solid electrolytes obtained by the production method of the present embodiment do not have the diffracted peaks at 2θ=17.5° and 26.1° which are observed in the crystalline $Li_3PS_4$, or even if they have the diffracted peaks, the extremely small peaks are detected as compared with the diffracted peaks of the thio-LISICON Region II type crystal structure.

The crystal structure represented by the composition formulas $Li_{7-x}P_{1-y}Si_yS_6$ and $Li_{7+x}P_{1-y}Si_yS_6$ (x is −0.6 to 0.6 and y is 0.1 to 0.6), which has the structural skeleton of $Li_7PS_6$ and in which a part of P is substituted with Si, is cubic or orthorhombic, preferably cubic, and has peaks mainly at positions of 2θ=15.5°, 18.0°, 25.0°, 30.0°, 31.4°, 45.3°, 47.0°, and 52.0° in X-ray diffraction measurement using CuKα rays. The crystal structure represented by the composition formula $Li_{7-x-2y}PS_{6-x-y}Cl_x$ ($0.8 \leq x \leq 1.7$, $0<y \leq -0.25x+0.5$) is preferably cubic, and has peaks mainly at positions of 2θ=15.5°, 18.0°, 25.0°, 30.0°, 31.4°, 45.3°, 47.0°, and 52.0° in X-ray diffraction measurement using CuKα rays. The crystal structure represented by the composition formula $Li_{7-x}PS_{6-x}Ha_x$ (Ha is Cl or Br, x is preferably 0.2 to 1.8) is preferably cubic, and has peaks mainly at positions of 2θ=15.5°, 18.0°, 25.0°, 30.0°, 31.4°, 45.3°, 47.0°, and 52.0° in X-ray diffraction measurement using CuKα rays. The crystal structure basically having the structural skeleton of $Li_7PS_6$ is also referred to as Argyrodite-type crystal structure.

In addition, these peak positions may be shifted within a range of ±0.5°.

The shape of the crystalline sulfide solid electrolyte is not particularly limited, and examples thereof include a particulate shape. The average particle diameter ($D_{50}$) of the particulate crystalline sulfide solid electrolyte can be, for example, in the range of 0.01 μm to 500 μm and 0.1 μm to 2θ0 μm.

(Properties of Modified Sulfide Solid Electrolyte)

The modified sulfide solid electrolyte of the present embodiment has a BET specific surface area of 10 $m^2/g$ or more and has a large specific surface area. The BET specific surface area of the sulfide solid electrolyte is preferably 12 $m^2/g$ or more, more preferably 15 $m^2/g$ or more, and still more preferably 20 $m^2/g$ or more, from the viewpoint that the higher the BET specific surface area is, the more superiority of the effect can be exhibited. From the same viewpoint, the upper limit thereof is not particularly limited, but is practically 100 $m^2/g$ or less, preferably 75 $m^2/g$ or less, and more preferably 50 $m^2/g$ or less.

Even in a case where the lithium halide adheres to the surface of the sulfide solid electrolyte, the BET specific surface area of the sulfide solid electrolyte is not significantly affected, and the BET specific surface area of the sulfide solid electrolyte used in the present embodiment and the BET specific surface area of the modified sulfide solid electrolyte are substantially the same. Therefore, when sulfide solid electrolytes having a BET specific surface area of 10 $m^2/g$ or more are used, the modified sulfide solid electrolytes naturally have a BET specific surface area of 10 $m^2/g$ or more.

The modified sulfide solid electrolyte of the present embodiment has a large BET specific surface area as described above, but has a small oil absorption of usually less than 0.9 mL/g, further 0.85 mL/g or less, or less than 0.80 mL/g due to the effect of the lithium halide adhering to the surface. Since the modified sulfide solid electrolyte of the present embodiment has a small oil absorption in spite of a large BET specific surface area, it is possible to suppress an increase in the viscosity of the paste when the modified sulfide solid electrolyte is made into a paste, and excellent coating suitability is obtained when the modified sulfide solid electrolyte is coated. Further, it is not necessary to use a solvent or the like in order to suppress an increase in the viscosity of the paste, and thus excellent battery performance is easily obtained.

In the description herein, regarding the oil absorption, 1 g of the modified sulfide solid electrolyte was used as a sample, an operation of adding one drop of butyl butyrate in a mortar or the like and stirring with a spatula was performed, and the operation was repeated until the sample became a paste state, and the total amount of added butyl butyrate was taken as the oil absorption (mL/g). Here, the "paste state" means a state of "being able to be spread without cracking or crumbling and being lightly attached to a measurement plate" defined in "7.2 Measurement" of JIS K 5101-13-1:2004 (Test methods for pigments-Part 13: Oil absorption-Section 1: Refined linseed oil method).

In addition, the ion conductivity of the modified sulfide solid electrolyte of the present embodiment is usually 0.5 mS/cm or more, and further 1.0 mS/cm or more, 1.5 mS/cm or more, 2.0 mS/cm or more, or 2.5 mS/cm or more, which is extremely high ion conductivity, and a lithium battery having excellent battery performance is obtained.

(Use)

The modified sulfide solid electrolyte of the present embodiment is excellent in coating suitability and can be used for the production of a battery without using a solvent or the like, and therefore can efficiently exhibit excellent battery performance. Further, since the modified sulfide solid electrolyte has high ion conductivity and excellent battery performance, the modified sulfide solid electrolyte is suitably used in a battery.

The modified sulfide solid electrolyte of the present embodiment may be used in a positive electrode layer, may be used in a negative electrode layer, or may be used in an electrolyte layer. Each layer can be produced by a known method.

In addition to the positive electrode layer, the electrolyte layer and the negative electrode layer, it is preferable to use a current collector as the above battery, and a known current collector can be used. For example, a layer obtained by coating a material that reacts with the solid electrolyte, such as Au, Pt, Al, Ti, or Cu, with Au or the like can be used.

(Method for Producing Modified Sulfide Solid Electrolyte)

The method for producing a modified sulfide solid electrolyte of the present embodiment is a production method including: mixing a sulfide solid electrolyte having a BET specific surface area of 10 $m^2/g$ or more and containing a lithium atom, a sulfur atom, a phosphorus atom, and a halogen atom, an epoxy compound, and an organic solvent; and removing the organic solvent. According to the production method of the present embodiment, it is possible to efficiently produce the modified sulfide solid electrolyte of the present embodiment, that is, it is preferable that the modified sulfide solid electrolyte of the present embodiment is produced by the production method of the present embodiment.

As the sulfide solid electrolyte having a BET specific surface area of 10 $m^2/g$ or more and containing a lithium atom, a sulfur atom, a phosphorus atom, and a halogen atom, which is used in the production method of the present embodiment, the same sulfide solid electrolyte as described above as being capable of being used in the modified sulfide solid electrolyte of the present embodiment is employed. Therefore, as the sulfide solid electrolyte, a commercially available product may be used, or a product produced by the method of the sulfide solid electrolyte described above can be used.

Examples of the organic solvent used in the production method of the present embodiment include the solvents as described above as being capable of being used in the method for producing a sulfide solid electrolyte. From the viewpoint of accelerating the mixing of the sulfide solid electrolyte and the epoxy compound to efficiently obtain a modified sulfide solid electrolyte containing the sulfide solid electrolyte and the epoxy compound, and further from the viewpoint of accelerating the adhesion of the epoxy compound to the sulfide solid electrolyte, among the solvents described above, an aliphatic hydrocarbon solvent, an alicyclic hydrocarbon solvent, an aromatic hydrocarbon solvent, or an ether solvent, an ester solvent, or a nitrile solvent exemplified as the complexing agent is preferably used, and an aromatic hydrocarbon solvent is more preferably used.

In the production method of the present embodiment, these organic solvents may be used alone or in combination of two or more thereof.

In the production method of the present embodiment, the method for mixing the sulfide solid electrolyte, the epoxy compound, and the organic solvent can be performed by the same method as the "(Mixing)" in the method for producing the sulfide solid electrolyte described above.

The removal of the organic solvent can be performed by the same method as the "(Drying)" in the method for producing the sulfide solid electrolyte described above.

In addition, in the production method of the present embodiment, the "(Heating)" in the method for producing the sulfide solid electrolyte described above may be performed.

[Modified Sulfide Solid Electrolyte of Another Aspect]

A modified sulfide solid electrolyte of another aspect of the present embodiment (the modified sulfide solid electrolyte according to the fifteenth aspect of the present embodiment) is a modified sulfide solid electrode including; a sulfide solid electrolyte having a BET specific surface area of 10 $m^2/g$ or more and containing a lithium atom, a sulfur atom, a phosphorus atom, and a halogen atom; and an epoxy compound. As described above, similarly to the modified sulfide solid electrolyte of the present embodiment described above, such a modified sulfide solid electrolyte of another aspect also exhibits an effect of being excellent in coating suitability when coated as a paste and being capable of efficiently exhibiting excellent battery performance.

The BET specific surface area, the epoxy compound, the sulfide solid electrolyte and the method for producing the same, and the method for producing the modified sulfide solid electrolyte in the modified sulfide solid electrolyte of another aspect are the same as those described for the modified sulfide solid electrolyte of the present embodiment described above.

[Electrode Mixture]

The electrode mixture of the present embodiment is an electrode mixture including the modified sulfide solid electrolyte of the present embodiment described above and an electrode active material, or an electrode mixture including the modified sulfide solid electrolyte of another aspect described above and an electrode active material.

(Electrode Active Material)

As the electrode active material, a positive electrode active material and a negative electrode active material are adopted depending on whether the electrode mixture is used for the positive electrode or the negative electrode.

As the positive electrode active material, any material can be used without particular limitation as long as it can promote a battery chemical reaction involving the movement of lithium ions caused by atoms, preferably lithium atoms, adopted as atoms for exhibiting ion conductivity in relation to the negative electrode active material. Examples of such a positive electrode active material capable of insertion and elimination of lithium ions include an oxide-based positive electrode active material and a sulfide-based positive electrode active material.

Preferred examples of the oxide-based positive electrode active material include lithium-containing transition metal composite oxides such as LMO (lithium manganate), LCO (lithium cobaltate), NMC (lithium nickel manganese cobaltate), NCA (lithium nickel cobalt aluminate), LNCO (lithium nickel cobaltate), and olivine type compounds ($LiMeNPO_4$, Me=Fe, Co, Ni, or Mn).

Examples of the sulfide-based positive electrode active material include titanium sulfide ($TiS_2$), molybdenum sulfide ($MoS_2$), iron sulfide (FeS, $FeS_2$), copper sulfide (CuS), and nickel sulfide ($Ni_3S_2$).

In addition to the positive electrode active material described above, niobium selenide ($NbSe_3$) or the like can also be used.

As the positive electrode active material, one kind can be used alone, or a plurality of kinds can be used in combination.

As the negative electrode active material, any material can be used without particular limitation as long as it can promote a battery chemical reaction accompanied by movement of lithium ions preferably caused by lithium atoms, such as a metal capable of forming an alloy with atoms adopted as atoms for exhibiting ion conductivity, preferably lithium atoms, an oxide thereof, and an alloy of the metal and lithium atoms. As such a negative electrode active material capable of insertion and elimination of lithium ions, those known as a negative electrode active material in the field of batteries can be adopted without limitation.

Examples of such a negative electrode active material include metals capable of forming metal lithium or an alloy with metal lithium, such as metal lithium, metal indium, metal aluminum, metal silicon, and metal tin, oxides of these metals, and alloys of these metals and metal lithium.

The electrode active material used in the present embodiment may have a coating layer in which a surface thereof is coated.

Examples of the material for forming the coating layer include an ion conductor such as a nitride, an oxide, or a composite thereof of an atom, preferably a lithium atom, which exhibits ion conductivity in the sulfide solid electrolyte. Specific examples thereof include a conductor having a LISICON type crystal structure such as $Li_{4-2x}Zn_xGeO_4$ having lithium nitride ($Li_3N$) or $Li_4GeO_4$ as a main structure, a conductor having a thio-LISICON type crystal structure such as $Li_{4-x}Ge_{1-x}P_xS_4$ having a $Li_3PO_4$ type skeleton structure, a conductor having a perovskite type crystal structure such as $La_{2/3-x}Li_{3x}TiO_3$, and a conductor having a NASICON type crystal structure such as $LiTi_2(PO_4)_3$.

In addition, examples thereof include lithium titanates such as $Li_yTi_{3-y}O_4$ ($0<y<3$) and $Li_4Ti_5O_{12}$ (LTO); lithium metal oxides of metals belonging to Group 5 of the periodic table, such as $LiNbO_3$ and $LiTaO_3$; and oxide-based conductors such as $Li_2O—B_2O_3—P_2O_5$-based conductors, $Li_2O—B_2O_3—ZnO$-based conductors, and $Li_2O—Al_2O_3—SiO_2—P_2O_5—TiO_2$-based conductors.

The electrode active material having a coating layer can be obtained, for example, by adhering a solution containing various atoms constituting the materials for forming the coating layer to the surface of the electrode active material, and firing the electrode active material after the adhesion preferably at 200° C. or higher and 400° C. or lower.

Here, as the solution containing various atoms, for example, a solution containing alkoxide of various metals such as lithium ethoxide, titanium isopropoxide, niobium isopropoxide, or tantalum isopropoxide may be used. In this case, as the solvent, an alcohol-based solvent such as ethanol or butanol, an aliphatic hydrocarbon solvent such as hexane, heptane, or octane, an aromatic hydrocarbon solvent such as benzene, toluene, or xylene, or the like may be used.

The adhesion may be performed by immersion, spray coating, or the like.

The firing temperature is preferably 200° C. or higher and 400° C. or lower, and more preferably 250° C. or higher and 390° C. or lower from the viewpoint of improving production efficiency and battery performance, and the firing time is usually about 1 minute to 10 hours, and preferably 10 minutes to 4 hours.

The coverage of the coating layer is preferably 90% or more, more preferably 95% or more, and still more preferably 100% based on the surface area of the electrode active material, that is, the entire surface is preferably coated. Further, the thickness of the coating layer is preferably 1 nm or more, and more preferably 2 nm or more, and the upper limit thereof is preferably 30 nm or less, and more preferably 25 nm or less.

The thickness of the coating layer can be measured by cross-sectional observation with a transmission electron microscope (TEM), and the coverage can be calculated from the thickness of the coating layer, an elemental analysis value, and a BET specific surface area.

Other Components

The electrode mixture of the present embodiment may contain other components such as a conductive material and a binder in addition to the modified sulfide solid electrolyte and the electrode active material described above. That is, the method for producing an electrode mixture of the present embodiment may use other components such as a conductive material and a binder in addition to the modified sulfide solid electrolyte and the electrode active material described above. When the modified sulfide solid electrolyte and the electrode active material are mixed, other components such as the conductive agent and the binder may be further added to and mixed with the modified sulfide solid electrolyte and the electrode active material.

From the viewpoint of improving battery performance by improving electron conductivity, examples of the conductive material include carbon-based materials such as artificial graphite, graphite carbon fiber, resin-fired carbon, pyrolytic vapor-grown carbon, coke, mesocarbon microbeads, furfuryl alcohol resin-fired carbon, polyacene, pitch-based carbon fiber, vapor-grown carbon fiber, natural graphite, and non-graphitizing carbon.

By using the binder, the strength in a case where the positive electrode and the negative electrode are produced is improved.

The binder is not particularly limited as long as functions such as binding properties and flexibility can be imparted thereto, and examples thereof include various resins such as a fluorine-based polymer such as polytetrafluoroethylene and polyvinylidene fluoride, a thermoplastic elastomer such as butylene rubber and styrene-butadiene rubber, an acrylic resin, an acrylic polyol resin, a polyvinyl acetal resin, a polyvinyl butyral resin, and a silicone resin.

The blending ratio (mass ratio) of the electrode active material and the modified sulfide solid electrolyte in the electrode mixture is preferably 99.5:0.5 to 40:60, more preferably 99:1 to 50:50, and still more preferably 98:2 to 60:40, in order to improve battery performance and in consideration of production efficiency.

In a case where the conductive material is contained, the content of the conductive material in the electrode mixture is not particularly limited, but is preferably 0.5% by mass or more, more preferably 1% by mass or more, and still more preferably 1.5% by mass or more in order to improve battery performance and in consideration of production efficiency, and the upper limit thereof is preferably 10% by mass or less, preferably 8% by mass or less, and still more preferably 5% by mass or less.

In addition, in a case where the binder is contained, the content of the binder in the electrode mixture is not particularly limited, but is preferably 1% by mass or more, more preferably 3% by mass or more, and still more preferably 5% by mass or more in order to improve battery performance and in consideration of production efficiency, and the upper limit thereof is preferably 20% by mass or less, preferably 15% by mass or less, and still more preferably 10% by mass or less.

[Lithium Ion Battery]

The lithium ion battery of the present embodiment is a lithium ion battery including at least one selected from the modified sulfide solid electrolyte of the present embodiment and the electrode mixture described above, and including at least one selected from the modified sulfide solid electrolyte of another aspect and the electrode mixture described above.

The configuration of the lithium ion battery of the present embodiment is not particularly limited as long as the lithium ion battery includes any one of the modified sulfide solid electrolyte of the present embodiment, the electrode mixture including this modified sulfide solid electrolyte, the modified sulfide solid electrolyte of another aspect, and the electrode mixture including this modified sulfide solid electrolyte. The lithium ion battery may have a configuration of a general-purpose lithium ion battery.

The lithium ion battery of the present embodiment preferably includes, for example, a positive electrode layer, a negative electrode layer, an electrolyte layer, and a current collector. It is preferable that the electrode mixture of the present embodiment is used as the positive electrode layer and the negative electrode layer, and it is preferable that the modified sulfide solid electrolyte of the present embodiment or the modified sulfide solid electrolyte of another aspect is used as the electrolyte layer.

In addition, a known current collector may be used as the current collector. For example, a layer obtained by coating a material that reacts with the solid electrolyte, such as Au, Pt, Al, Ti, or Cu, with Au or the like can be used.

EXAMPLES

Next, the present invention will be specifically described by Examples, but the present invention is not limited by these Examples at all.

Production Example 1: Preparation of Sulfide Solid Electrolyte 1

Into a Schlenk (capacity: 100 mL) with a stirring bar under a nitrogen atmosphere, 0.59 g of lithium sulfide, 0.95 g of diphosphorus pentasulfide, 0.19 g of lithium bromide, and 0.28 g of lithium iodide were introduced. After the stirring bar was rotated, 20 mL of tetramethylethylenecliamine (TMEDA) as a complexing agent was added, stirring was continued for 12 hours, and the obtained complex-containing material was dried under vacuum (room temperature: 23° C.) to obtain a powdery complex. Next, the powder of the complex was heated under vacuum at 120° C. for 2 hours to obtain an amorphous sulfide solid electrolyte. Further, the amorphous sulfide solid electrolyte was heated under vacuum at 140° C. for 2 hours to obtain a crystalline sulfide solid electrolyte 1 (the heating temperature (140° C. in this example) for obtaining the crystalline sulfide solid electrolyte may be referred to as a "crystallizing temperature").

When the BET specific surface areas of the obtained amorphous sulfide solid electrolyte and the obtained crystal sulfide solid electrolyte were measured, they were both 40 $m^2/g$.

Production Example 2: Preparation of Sulfide Solid Electrolyte 2

30.0 g of the sulfide solid electrolyte powder obtained in Production Example 1 and 470 g of toluene were charged into a reaction tank with a stirring blade (capacity: 500 mL) under a nitrogen atmosphere. After the stirring blade was rotated, a pulverization treatment was performed for 30 minutes under predetermined conditions (bead material: zirconia, bead diameter: 0.1 mmφ, amount of beads used: 391 g, pump flow rate: 150 mL/min, circumferential speed: 8 m/s, mill jacket temperature: 20° C.) using a beads mill ("UAM-015 (model number)", manufactured by Hiroshima Metal & Machinery Co., Ltd.) corresponding to micro beads capable of circulating operation. The obtained slurry was dried under vacuum (room temperature: 23° C.) to obtain a white powder of amorphous solid electrolyte. This white powder was crystallized at 160° C. for 2 hours to obtain a crystalline sulfide solid electrolyte 2. The BET specific surface area of the obtained crystalline sulfide solid electrolyte 2 was measured and found to be 10 $m^2/g$.

Production Example 3: Preparation of Sulfide Solid Electrolyte 3

30.0 g of the sulfide solid electrolyte powder obtained in Production Example 1 and 470 g of toluene were charged into a reaction tank with a stirring blade (capacity: 500 mL) under a nitrogen atmosphere. After the stirring blade was rotated, a first pulverization treatment was performed for 30 minutes under predetermined conditions (bead material: zirconia, bead diameter: 0.05 mmφ, amount of beads used: 391 g, pump flow rate: 150 mL/min, circumferential speed: 8 m/s, mill jacket temperature: 20° C.) using a beads mill ("UAM-015 (model number)", manufactured by Hiroshima Metal & Machinery Co., Ltd.) corresponding to micro beads capable of circulating operation. Next, a second pulverization treatment was performed for 10 minutes while the circumferential speed was changed to 12.5 m/s. The obtained slurry was dried under vacuum (room temperature: 23° C.) to obtain a white powder of amorphous solid electrolyte. This white powder was crystallized at 160° C. for 2 hours to obtain a crystalline sulfide solid electrolyte 3. The BET specific surface area of the obtained crystalline sulfide solid electrolyte 3 was measured and found to be 8 $m^2/g$.

Production Example 4: Preparation of Sulfide Solid Electrolyte 4

A mixture was weighed so as to have a molar ratio of $Li_2S:P_2S_5:LiBr:LiCl=47.5:12.5:15.0:25.0$ and a total of 110.0 g in a glove box in a nitrogen atmosphere, and the mixture was roughly mixed by shaking in a glass container.

Under a nitrogen atmosphere, a slurry (slurry concentration: 10% by mass) obtained by dispersing the roughly mixed raw materials in a mixed solvent of 1140 mL of dehydrated toluene (manufactured by FUJIFILM Wako Pure Chemical Corporation) and 7 mL of dehydrated isobutyronitrile (manufactured by Kishida Chemical Co., Ltd.) was mixed and pulverized for 1 hour (bead material: zirconia, bead diameter: 0.5 mmφ), amount of beads used: 456 g, pump flow rate: 500 mL/min, circumferential speed: 12 m/s) using a beads mill ("LMZ015 (model number)", manufactured by Ashizawa Finetech Ltd.) capable of circulating operation. Next, 30.0 g of the raw material mixture obtained by drying the slurry under reduced pressure was dispersed in 300 mL of ethylbenzene (manufactured by FUJIFILM Wako Pure Chemical Corporation). The slurry was dried under reduced pressure to distill off the solvent, and then the residue was fired by being held at 380° C. for 1 hour or more using an electric oven ("F-1404-A (model number)", manufactured by Tokyo Garasu Kikai Co., Ltd.) in a glove box under a nitrogen atmosphere, thereby obtaining a sulfide solid electrolyte 4 having Argyrodite-type crystal structure. The BET specific surface area of the obtained crystalline sulfide solid electrolyte 4 was measured and found to be 12 $m^2/g$.

Example 1

3 g of the crystalline sulfide solid electrolyte 1 obtained in Production Example 1 was weighed and added to a Schlenk (capacity: 100 mL) with a stirring bar under a nitrogen atmosphere, 22 g of toluene was added and stirred to obtain a slurry state fluid. Butylene oxide as an epoxy compound in an amount of 0.05 g (5 parts by mass with respect to 100 parts by mass of the crystalline sulfide solid electrolyte) was further added to the slurry state fluid, and after stirring for 10 minutes, toluene was distilled off by vacuum drying to obtain a modified sulfide solid electrolyte.

For the obtained modified sulfide solid electrolyte, the oil absorption and the ion conductivity were measured based on the following methods. In addition, the reduction rate of the oil absorption was calculated based on the following method. The measurement results and calculation results are shown in Table 1. Further, when FT-IR spectroscopy (ATR method) was performed based on the following method, it was confirmed that the infrared absorption spectrum had a peak at 2800 to 3000 $cm^{-1}$. In addition, when $^1$H-NMR measurement was performed based on the following method, it was also confirmed that the $^1$H-NMR spectrum had a peak of 0.0 to 5.0 ppm derived from an alkyl chain.

Examples 2 to 19

Modified sulfide solid electrolytes were prepared in the same manner as in Example 1 except that the type of the crystalline sulfide solid electrolyte and the type and amount of the epoxy compound used in Example 1 were as shown in Table 1.

For the obtained modified sulfide solid electrolyte, the oil absorption and the ion conductivity were measured based on the following methods. In addition, the reduction rate of the oil absorption was calculated by the following method. The measurement results and calculation results are shown in Table 1. Further, when FT-IR spectroscopy (ATR method) was performed based on the following method, it was confirmed that the infrared absorption spectrum had a peak at 2800 to 3000 $cm^{-1}$. In addition, when $^1$H-NMR measurement was performed based on the following method, it was also confirmed that the $^1$H-NMR spectrum had a peak of 0.0 to 5.0 ppm derived from an alkyl chain.

Comparative Examples 1 to 3

For each of the sulfide solid electrolytes 1 to 3 obtained in Production Examples 1 to 3, the oil absorption and the ion conductivity were measured based on the following methods. In addition, the reduction rate of the oil absorption was calculated by the following method. The measurement results and calculation results are shown in Table 1. The oil absorptions of the sulfide solid electrolytes 1 to 3 were 1.03 mL/g, 0.93 mL/g, and 0.66 mL/g, respectively.

Further, when FT-IR spectroscopy (ATR method) was performed based on the following method, a peak could not be found at 2800 to 3000 $cm^{-1}$ in the infrared absorption spectrum. In addition, when $^1$H-NMR measurement was performed based on the following method, a peak of 0.0 to 5.0 ppm derived from an alkyl chain could not be found.

(Measurement of Oil Absorption)

1 g of the solid electrolyte obtained in Examples and Comparative Examples was used as a sample, and an operation of adding one drop of butyl butyrate using a dropper and stirring with a spatula was performed in an agate mortar, and this operation was repeated until the sample became a paste state, and the total amount of added butyl butyrate was defined as the oil absorption (mL/g). The measured oil absorption was evaluated according to the following criteria.

A. less than 0.8 mL/g

B. 0.8 mL/g or more and less than 0.9 mL/g

C. 0.9 mL/g or more (Reduction Rate of Oil Absorption)

In the same manner as in the above (Measurement of Oil Absorption), the oil absorption of each of the sulfide solid electrolytes 1 to 4 obtained in Production Examples 1 to 4 was measured. Using the oil absorption A of each of the sulfide solid electrolytes 1 to 4 and the oil absorption B of each of the sulfide solid electrolytes obtained in Examples and Comparative Examples by the above (Measurement of Oil Absorption), a numerical value calculated by the following formula was defined as the reduction rate of the oil absorption. Here, the oil absorption of any one of the sulfide solid electrolytes 1 to 4 used in Examples and Comparative Examples is used as the oil absorption A. For example, the reduction rate of the oil absorption of Example 1 is calculated using the oil absorption of the sulfide solid electrolyte 1 as the oil absorption A and the oil absorption of the modified sulfide solid electrolyte of Example 1 as the oil absorption B.

$$\text{Reduction rate of oil absorption}=(\text{oil absorption } A-\text{oil absorption } B)/(\text{oil absorption } A)\times 100(\%)$$

(Measurement of Ion Conductivity)

In this example, the ion conductivity was measured as follows.

A circular pellet having a diameter of 10 mm (cross-sectional area S: 0.785 $cm^2$) and a height (L) of 0.1 to 0.3 cm was formed from the sulfide solid electrolyte and used as a sample. Electrode terminals were taken from the top and bottom of the sample, and measurement was performed by an alternating current impedance method at 25° C. (range of frequencies: 1 MHz to 100 Hz, amplitudes: 10 mV) to obtain a Cole-Cole plot. The real part Z' (Ω) at a point where −Z" (Ω) is minimum near the right end of the arc observed in the high-frequency side region was set as the bulk resistance R (Ω) of the electrolyte, and the ion conductivity σ (S/cm) was calculated according to the following equation.

$$R=\rho(L/S)$$

$$\sigma=1/\rho$$

The measured ion conductivity was evaluated according to the following criteria.

A. 2.5 mS/cm or more

B. 0.5 mS/cm or more and less than 2.5 mS/cm

C. less than 0.5 mS/cm (FT-IR Spectroscopy (ATR Method))

Measurement apparatus: FR-IR spectrometer "VERTEX70v (model number)", manufactured by Bruker Measurement method: attenuated total reflection method (ATR method)

Measurement wave number range: 650 to 4000 $cm^{-1}$

Illuminant: Globar lamp (SiC)

Detector: DTGS detector

Resolution: 4 $cm^{-1}$

Measurement time: 1 second/time

Number of integrations: 256

Measurement conditions: A diamond prism was used and irradiation was performed at an incident angle of 45°.

($^1$H-NMR Measurement)

Nuclear magnetic resonance apparatus (NMR apparatus): AVANCE III HD (manufactured by BEUKER Co., Ltd.)

Observation nucleus: $^1$H

Resonance frequencies: 500 MHz

Probe: 5 mmφ TCI cryoprobe

Measurement temperature: 25° C.

Number of integrations: 16

TABLE 1

| | | Sulfide solid electrolyte | Specific surface area [$m^2$/g] | Epoxy compound | Molecular weight | Content [% by mass] | Oil absorption | Oil absorption reduction rate [%] | Ion conductivity | Ion conductivity [mS/cm] |
|---|---|---|---|---|---|---|---|---|---|---|
| Example | 1 | 1 | 40 | 1,2-Butylene Oxide | 71 | 5 | B | 20 | B | 1.3 |
| | 2 | 1 | 40 | 1,2-Butylene Oxide | 71 | 20 | A | 30 | B | 0.5 |
| | 3 | 1 | 40 | 1,2-Epoxyoctane | 128 | 5 | B | 28 | B | 1.1 |
| | 4 | 1 | 40 | 1,2-Epoxyoctane | 128 | 20 | A | 38 | B | 0.5 |
| | 5 | 1 | 40 | 1,2-Epoxyoctadecane | 268 | 0.1 | B | 15 | A | 3.4 |
| | 6 | 1 | 40 | 1,2-Epoxyoctadecane | 268 | 1 | A | 29 | A | 3.0 |
| | 7 | 1 | 40 | 1,2-Epoxyoctadecane | 268 | 20 | A | 46 | B | 1.2 |
| | 8 | 1 | 40 | 2,2,3,3,4,4,5,5,5-Nonafluoropentyoxirane | 276 | 1 | B | 28 | A | 2.7 |
| | 9 | 1 | 40 | 2,2,3,3,4,4,5,5,5-Nonafluoropentyoxirane | 276 | 20 | A | 43 | B | 0.6 |
| | 10 | 1 | 40 | Butyl Glycidyl Ether | 130 | 5 | A | 32 | B | 1.0 |
| | 11 | 1 | 40 | 2-Ethylhexyl Glycidyl Ether | 186 | 1 | B | 26 | A | 2.6 |
| | 12 | 1 | 40 | 2-Ethylhexyl Glycidyl Ether | 186 | 20 | A | 42 | B | 0.6 |
| | 13 | 1 | 40 | 4-tert-Butylphenyl Glycidyl Ether | 206 | 1 | B | 24 | A | 2.5 |
| | 14 | 1 | 40 | (S)-Glycidyl Trityl Ether | 316 | 1 | B | 25 | A | 2.5 |
| | 15 | 1 | 40 | tert-Butyldimethylsilyl (S)-Glycidyl Ether | 188 | 1 | B | 28 | A | 2.5 |
| | 16 | 1 | 40 | 1,1,1,3,5,5,5-Heptamethy-3-(3-glycidyloxypropyl)trisiloxane | 337 | 0.1 | B | 16 | A | 3.3 |
| | 17 | 1 | 40 | 1,1,1,3,5,5,5-Heptamethy-3-(3-glycidyloxypropyl)trisiloxane | 337 | 1 | A | 31 | A | 2.7 |
| | 18 | 1 | 40 | 1,1,1,3,5,5,5-Heptamethy-3-(3-glycidyloxypropyl)trisiloxane | 337 | 20 | A | 54 | B | 1.0 |
| | 19 | 2 | 10 | 1,2-Epoxyoctadecane | 268 | 1 | A | 25 | A | 2.8 |
| | 21 | 1 | 40 | 1,2-Epoxyoctadecane | 268 | 3 | A | 35 | — | — |
| | 22 | 1 | 40 | 1,2-Epoxyoctadecane | 268 | 10 | A | 40 | — | — |
| Comparative Example | 1 | 1 | 40 | — | — | — | C | — | A | 3.4 |
| | 2 | 2 | 10 | — | — | — | C | — | A | 3.5 |
| | 3 | 3 | 8 | — | — | — | A | — | A | 3.7 |

From Examples, it was confirmed that since the modified sulfide solid electrolyte of the present embodiment was evaluated as A or B in terms of the oil absorption and the reduction rate of the oil absorption was 15% or more in all cases, the modified sulfide solid electrolyte had a small oil absorption and excellent coating suitability even though the specific surface area was as large as 10 $m^2$/g or more. In addition, it was also confirmed that the modified sulfide solid electrolyte had a high ion conductivity evaluated as A or B.

On the other hand, the sulfide solid electrolytes of Comparative Examples 1 to 3 which are not mixed with an epoxy compound and do not contain an epoxy compound are the sulfide solid electrolytes 1 to 3 produced in Production Examples 1 to 3, respectively, and are conventional sulfide solid electrolytes themselves. The sulfide solid electrolytes 1 and 2 having a specific surface area of 10 $m^2$/g or more of Comparative Examples 1 and 2 were evaluated as C in terms of the oil absorption, and it was confirmed that the coating suitability was poor. In addition, the sulfide solid electrolyte 3 of Comparative Example 3 was evaluated as A in both the evaluation of the oil absorption and the evaluation of the ion conductivity, and it was confirmed that the necessity of the modification was poor. That is, it was confirmed that the method for producing modified sulfide solid electrolytes of the present embodiment is suitable for those having a large specific surface area of 10 $m^2$/g or more because the method can exhibit the effect of reducing the oil absorption and improving the coating suitability.

Example 20

The modified sulfide solid electrolytes obtained in the above Examples were examined below to confirm whether or not the epoxy compound was adhered to the sulfide solid electrolyte.

First, toluene was added to the modified sulfide solid electrolyte obtained in Example 6 in which the content of 1,2-epoxyoctadecane was 1% by mass (the amount of 1,2-epoxyoctadecane used was 1 part by mass with respect to 100 parts by mass of the sulfide solid electrolyte) to form a slurry state (slurry concentration: 12% by mass), and it was left to stand for 12 hours. A supernatant liquid generated by sedimentation of the sulfide solid electrolyte was collected and analyzed by gas chromatography mass spectrometry (GC/MS method). In the quantification in this analysis, the charged liquid (1% by mass toluene solution of 1,2-epoxyoctadecane) was also analyzed in the same manner as the supernatant liquid, and the peak area of 1,2-epoxyoctadecane in the charged liquid was set to 1 and compared with the peak area of 1,2-epoxyoctadecane remaining in the supernatant liquid (the closer the peak area of the supernatant liquid to 1, the more the epoxy compound was liberated from the sulfide solid electrolyte and dissolved in toluene). According to the analysis, the epoxy compound was not detected from the supernatant liquid. Therefore, it is considered that the epoxy compound was all adhered to the sulfide solid electrolyte.

(Gas Chromatography Mass Spectrometry Conditions)

Gas chromatography: 6890B (manufactured by Agilent)

Analytical column: HP-5 ms (manufactured by Agilent)

GC oven temperature rise conditions:

Initial temperature 50° C.

Temperature rise from 50° C. to 300° C. at 10° C./min.

Hold at 300° C. for 5 minutes

Sample injection amount: 1 μL

In addition, the precipitated sulfide solid electrolyte was washed by repeating three times a step of adding toluene to the precipitated sulfide solid electrolyte, stirring the mixture, allowing the mixture to stand for 12 hours, and removing the supernatant. After washing, the sulfide solid electrolyte obtained by drying the toluene was dissolved in deuterated methanol and subjected to $^{1}$H-NMR measurement by the above-described method, and as a result, a chemical shift of a group derived from an epoxy compound (an alkyl group or the like) was detected.

Example 21

A modified sulfide solid electrolyte was obtained in the same manner as in Example 6, except that the content of 1,2-epoxyoctadecane in Example 6 was changed to 3% by mass (the amount of 1,2-epoxyoctadecane used was 3 parts by mass with respect to 100 parts by mass of the sulfide solid electrolyte). The oil absorption of the obtained modified sulfide solid electrolyte was measured in accordance with the measurement of the oil absorption described above. In addition, the reduction rate of the oil absorption was calculated based on the following method. The measurement results and calculation results are shown in Table 1. In addition, a supernatant liquid of the obtained modified sulfide solid electrolyte was analyzed by gas chromatography mass spectrometry (GC/MS method) in the same manner as in Example 20. According to this analysis, although a small amount of the epoxy compound was detected from the supernatant liquid (peak area: 0.25), it was confirmed that the epoxy compound adhered to the sulfide solid electrolyte.

$^{1}$H-NMR measurement was performed on the precipitated powder in the same manner as in Example 20, and a chemical shift of a group derived from an epoxy compound (an alkyl group or the like) was detected.

Example 22

A modified sulfide solid electrolyte was obtained in the same manner as in Example 6, except that the content of 1,2-epoxyoctadecane in Example 6 was changed to 10% by mass (the amount of 1,2-epoxyoctadecane used was 10 parts by mass with respect to 100 parts by mass of the sulfide solid electrolyte). The oil absorption of the obtained modified sulfide solid electrolyte was measured in accordance with the measurement of the oil absorption described above. In addition, the reduction rate of the oil absorption was calculated based on the following method. The measurement results and calculation results are shown in Table 1. In addition, a supernatant liquid of the obtained modified sulfide solid electrolyte was analyzed by gas chromatography mass spectrometry (GC/MS method) in the same manner as in Example 20. According to this analysis, although a small amount of the epoxy compound was detected from the supernatant liquid (peak area: 0.43), it was confirmed that the epoxy compound adhered to the sulfide solid electrolyte.

$^{1}$H-NMR measurement was performed on the precipitated powder in the same manner as in Example 2θ, and a chemical shift of a group derived from an epoxy compound (an alkyl group or the like) was detected.

From the results of Examples 20 to 22, it was confirmed that in the modified sulfide solid electrolyte, the epoxy compound was contained so as to adhere to the sulfide solid electrolyte, and most of the epoxy compound remained in the modified sulfide solid electrolyte even after washing with toluene. In addition, from $^{1}$H-NMR measurement, it was confirmed that the epoxy compound remained in the modified sulfide solid electrolyte.

Examples 23 to 28

Modified sulfide solid electrolytes were prepared in the same manner as in Example 1 except that the type of crystalline sulfide solid electrolyte and the type and amount of the epoxy compound used in Example 1 were as shown in Table 2.

For the obtained modified sulfide solid electrolyte, the oil absorption and the ion conductivity were measured based on the methods described above. In addition, the reduction rate of the oil absorption was calculated based on the method described above. The measurement results and calculation results are shown in Table 2.

Comparative Example 4

For the sulfide solid electrolyte 4 obtained in Production Example 4, the oil absorption and the ion conductivity were measured based on the following methods. In addition, the reduction rate of the oil absorption was calculated based on the method described above. The measurement results and calculation results are shown in Table 2. The oil absorption of the sulfide solid electrolyte 4 was 1.06 mL/g.

Further, when FT-IR spectroscopy (ATR method) was performed based on the method described above, a peak could not be found at 2800 to 3000 $cm^{-1}$ in the infrared absorption spectrum. In addition, when $^{1}$H-NMR measurement was performed based on the method described above, a peak of 0.0 to 5.0 ppm derived from an alkyl chain could not be found.

(CV Measurement (Irreversible Capacity))

In order to evaluate the irreversible capacity, the following cell for CV measurement was used.

A total of 100 mg (sulfide solid electrolyte: DENKA BLACK (mass ratio)=85:15) of the sulfide solid electrolyte obtained in Examples and a DENKA BLACK granular product (particle size: 35 nm, manufactured by Denka Company Limited) was mixed using a mortar for 10 minutes, thereby obtaining a measurement powder (1).

100 mg of an electrolyte for a separator layer was added to a battery cell having a diameter of 10 mm, and the mixture was pressed three times using a SUS mold at 10 $MPa/cm^2$ while rotating 120° at a time, and then 50 mg of the measurement powder (1) was added thereto, and the mixture was pressed three times at 20 $MPa/cm^2$ while rotating 120° at a time. Next, from the side opposite to the measurement powder (1), the mixture was pressed three times at 20 $MPa/cm^2$ while rotating 120° at a time.

The electrolyte for the separator described above was synthesized under the following conditions.

20.5 g of $L_2S$, 33.1 g of $P_2S_5$, 10.0 g of LiI, and 6.5 g of LiBr were added to a 1 L reactor container equipped with a stirring blade under a nitrogen atmosphere. After rotating the stirring blade, 630 g of toluene was introduced and the slurry was stirred for 10 minutes. The reactor container was connected to a beads mill ("STARMILL LMZ015 (trade name)", manufactured by Ashizawa Finetech Ltd., zirconia beads material: zirconia, bead diameter: 0.5 mmφ, amount of beads used: 456 g) capable of circulating operation, and a pulverization treatment (pump flow rate: 650 mL/min, bead mill circumferential speed: 12 m/s, mill jacket temperature: 45° C.) was performed for 45 hours.

The obtained slurry was dried at room temperature (25° C.) under vacuum and then heated (80° C.) to obtain a white powder of amorphous solid electrolyte. Further, the obtained white powder was heated at 195° C. under vacuum for 2 hours to obtain a white powder of crystalline solid electrolyte. In the XRD spectrum of the crystalline solid electrolyte, crystallization peaks were detected at 2θ=20.2° and 23.6°, and it was confirmed that the crystalline solid electrolyte had a thio-LISICON Region II type crystal structure. In addition, the obtained crystalline solid electrolyte had an average particle diameter ($D_{50}$) of 4.5 μm and an ion conductivity of 5.0 mS/cm.

An InLi foil (having a layer structure, in which "/" represents between layers; In: 10 mmφ×0.1 mm/Li: 9 mmφ×0.08 mm/SUS: 10 mmφ×0.1 mm) was provided on the side opposite to that of the measurement powder (1) of the electrolyte for the separator layer, and pressed once at 6 $MPa/cm^2$. The cell was fixed by four screws sandwiching an insulator so as not to cause a short circuit between the measurement powder (1) and the InLi foil, and the screws were fixed at a torque of 8N m to obtain a measurement cell.

The obtained measurement cell was connected to a measuring instrument ("VSP-3 (model number)" manufactured by BioLogic), and a CV curve was obtained under the following conditions.

Measurement temperature: 25° C.

Sweep rate: 0.1 mV/s

Potential measurement range: open circuit voltage (+2.7 V)→+5.0 V→+2.7 V

Cycle number: 5 times

INDUSTRIAL APPLICABILITY

The modified sulfide solid electrolyte of the present embodiment has excellent coating suitability when coated as a paste and can efficiently exhibit excellent battery performance, even when using a sulfide solid electrolyte with a large specific surface area. In addition, since the modified sulfide solid electrolyte of the present embodiment has high ion conductivity, the modified sulfide solid electrolyte is suitably used for a battery, particularly, a battery used for an information-related device or a communication device such as a personal computer, a video camera, or a mobile phone.

The invention claimed is:

1. A modified sulfide solid electrolyte comprising:

a sulfide solid electrolyte having a BET specific surface area of 10 $m^2/g$ or more and containing a lithium atom, a sulfur atom, a phosphorus atom, and a halogen atom; and an epoxy compound, wherein:

the modified sulfide solid electrolyte has a peak at 2800 to 3000 $cm^{-1}$ in an infrared absorption spectrum obtained by FT-IR spectroscopy (ATR method); and the epoxy compound has a molecular weight of 60 or more and 400 or less.

TABLE 2

| | | Sulfide solid electrolyte | Specific surface area [$m^2/g$] | Epoxy compound | Molecular weight | Content [% by mass] | Oil absorption | Oil absorption reduction rate [%] | Ion conductivity | Ion conductivity [mS/cm] |
|---|---|---|---|---|---|---|---|---|---|---|
| Example | 23 | 1 | 40 | 1,1,1,3,5,5,5-Heptamethy-3-(3-glycidyloxypropyl)trisiloxane | 337 | 5 | A | 40 | B | 1.8 |
| | 24 | 1 | 40 | 1,2-Epoxyoctadecane | 71 | 5 | A | 38 | B | 2.1 |
| | 25 | 4 | 12 | 1,2-Epoxyoctadecane | 71 | 1 | B | 21 | A | 4.1 |
| | 26 | 4 | 12 | 1,2-Epoxyoctadecane | 71 | 5 | A | 45 | B | 1.9 |
| | 27 | 4 | 12 | 1,1,1,3,5,5,5-Heptamethy-3-(3-glycidyloxypropyl)trisiloxane | 337 | 1 | B | 17 | A | 2.7 |
| | 28 | 4 | 12 | 1,1,1,3,5,5,5-Heptamethy-3-(3-glycidyloxypropyl)trisiloxane | 337 | 5 | B | 32 | B | 1.5 |
| Comparative Example | 4 | 4 | 12 | — | — | — | C | — | A | 4.9 |

From Examples 23 to 28, it was confirmed that since the modified sulfide solid electrolyte of the present embodiment was evaluated as A or B in terms of the oil absorption and the reduction rate of the oil absorption was 17% or more in all cases, the modified sulfide solid electrolyte had a small oil absorption and excellent coating suitability even though the specific surface area was as large as 10 $m^2/g$ or more. In addition, it was also confirmed that the modified sulfide solid electrolyte had a high ion conductivity evaluated as A or B.

The modified sulfide solid electrolytes of Examples 23 and 24 and the sulfide solid electrolyte of Comparative Example 1 were subjected to CV measurement based on the above-described method. The CV curve at the first cycle is shown in FIG. 1. According to the CV curve of FIG. 1, in the modified sulfide solid electrolytes of Examples 23 and 24, a decrease in oxidation current can be observed, and thus it was found that the oxidation reaction occurring at the interface between the electrolyte and the conductive material can be suppressed by the coating with the epoxy compound. On the other hand, in the sulfide solid electrolyte of Comparative Example 1, it was found that the effect of suppressing the oxidation reaction was inferior to that of Examples 23 and 24.

2. The modified sulfide solid electrolyte according to claim 1, wherein the peak is derived from C—H stretching vibration of an alkyl chain in the epoxy compound.

3. The modified sulfide solid electrolyte according to claim 2, having a peak of 0.0 to 5.0 ppm derived from the alkyl chain in the 1H-NMR spectrum.

4. The modified sulfide solid electrolyte according to claim 1, wherein a content of the epoxy compound is 0.03 parts by mass or more and 25 parts by mass or less with respect to 100 parts by mass of the sulfide solid electrolyte.

5. The modified sulfide solid electrolyte according to claim 1, wherein the epoxy compound is at least one compound selected from an epoxy compound 1 represented by the following general formula (1), an epoxy compound 2 represented by the following general formula (2), and an epoxy compound 3 represented by the following general formula (3):

(1)

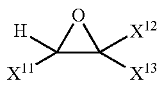

-continued (2)

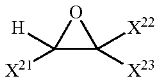

(3)

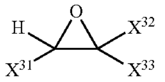

(2a)

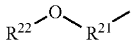

(3a)

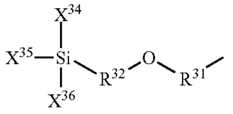

(3b)

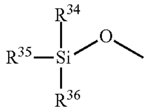

wherein, in the general formula (1), $X^{11}$ to $X^{13}$ are each independently a hydrogen atom, a halogen atom, a monovalent hydrocarbon group, or a monovalent halogenated hydrocarbon group, and at least one of $X^{11}$ to $X^{13}$ is a monovalent hydrocarbon group or a monovalent halogenated hydrocarbon group;

in the general formula (2), $X^{21}$ to $X^{23}$ are each independently a hydrogen atom, a halogen atom, a monovalent hydrocarbon group, a monovalent halogenated hydrocarbon group, or a group represented by the general formula (2a), and at least one of $X^{21}$ to $X^{23}$ is a group represented by the general formula (2a); in the general formula (2a), $R^{21}$ is a divalent hydrocarbon group, and $R^{22}$ is a hydrogen atom, a halogen atom, a monovalent hydrocarbon group, or a monovalent halogenated hydrocarbon group;

in the general formula (3), $X^{31}$ to $X^{33}$ are each independently a hydrogen atom, a halogen atom, a monovalent hydrocarbon group, a monovalent halogenated hydrocarbon group, or a group represented by the general formula (3a), and at least one of $X^{31}$ to $X^{33}$ is a group represented by the general formula (3a); in the general formula (3a), $R^{31}$ and $R^{32}$ are each independently a single bond or a divalent hydrocarbon group, and $X^{34}$ to $X^{36}$ are each independently a hydrogen atom, a halogen atom, a monovalent hydrocarbon group, a monovalent halogenated hydrocarbon group, —$OR^{33}$, or a group represented by the general formula (3b), and $R^{33}$ to $R^{36}$ are each independently a hydrogen atom, a halogen atom, a monovalent hydrocarbon group, or a monovalent halogenated hydrocarbon group.

6. The modified sulfide solid electrolyte according to claim 5, wherein the epoxy compound 1 is a compound represented by the general formula (1), wherein $X^{11}$ is a monovalent hydrocarbon group having 1 to 24 carbon atoms or a monovalent halogenated hydrocarbon group having 1 to 24 carbon atoms, and $X^{12}$ and $X^{13}$ are each a hydrogen atom.

7. The modified sulfide solid electrolyte according to claim 5, wherein the epoxy compound 2 is a compound represented by the general formula (2), wherein $X^{21}$ is a group represented by the general formula (2a), $X^{22}$ and $X^{23}$ are each a hydrogen atom, and in the general formula (2a), $R^{21}$ is a divalent hydrocarbon group having 1 to 8 carbon atoms, and $R^{22}$ is a monovalent hydrocarbon group having 1 to 24 carbon atoms.

8. The modified sulfide solid electrolyte according to claim 5, wherein the epoxy compound 3 is a compound represented by the general formula (3), wherein $X^{31}$ is a group represented by the general formula (3a), $X^{32}$ and $X^{33}$ are each a hydrogen atom, and in the general formula (3a), $R^{31}$ is a divalent hydrocarbon group having 1 to 8 carbon atoms, $R^{32}$ is a divalent hydrocarbon group having 1 to 8 carbon atoms, $X^{34}$ and $X^{36}$ are each a group represented by the general formula (3b), and $X^{35}$ is a monovalent hydrocarbon group having 1 to 24 carbon atoms, and in the general formula (3b), $R^{34}$ to $R^{36}$ are each a monovalent hydrocarbon group having 1 to 24 carbon atoms.

9. The modified sulfide solid electrolyte according to claim 5, wherein the epoxy compound 3 is a compound represented by the general formula (3), wherein $X^{31}$ is a group represented by the general formula (3a), $X^{32}$ and $X^{33}$ are each a hydrogen atom, and in the general formula (3a), $R^{31}$ is a divalent hydrocarbon group having 1 to 8 carbon atoms, $R^{32}$ is a single bond, and $X^{34}$ to $X^{36}$ are each a monovalent hydrocarbon group having 1 to 24 carbon atoms.

10. An electrode mixture comprising the modified sulfide solid electrolyte according to claim 1 and an electrode active material.

11. A lithium ion battery comprising the electrode mixture according to claim 10.

12. The modified sulfide solid electrolyte according to claim 1, wherein a content of the epoxy compound is 0.03 parts by mass or more and 10 parts by mass or less with respect to 100 parts by mass of the sulfide solid electrolyte.

13. The modified sulfide solid electrolyte according to claim 1, wherein the epoxy compound is at least one compound selected from an epoxy compound 2 represented by the following general formula (2), and an epoxy compound 3 represented by the following general formula (3):

(2)

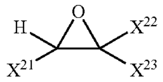

(3)

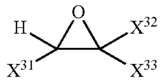

(2a)

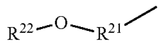

(3a)

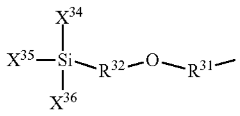

(3b)

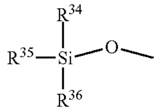

wherein, in the general formula (2), $X^{21}$ to $X^{23}$ are each independently a hydrogen atom, a halogen atom, a monovalent hydrocarbon group, a monovalent halogenated hydrocarbon group, or a group represented by the general formula (2a), and at least one of $X^{21}$ to $X^{23}$ is a group represented by the general formula (2a); in the general formula (2a), $R^{21}$ is a divalent hydrocarbon group, and $R^{22}$ is a hydrogen atom, a halogen atom, a monovalent hydrocarbon group having 2 or more carbon atoms, or a monovalent halogenated hydrocarbon group having 2 or more carbon atoms;

in the general formula (3), $X^{31}$ to $X^{33}$ are each independently a hydrogen atom, a halogen atom, a monovalent hydrocarbon group, a monovalent halogenated hydrocarbon group, or a group represented by the general formula (3a), and at least one of $X^{31}$ to $X^{33}$ is a group represented by the general formula (3a); in the general formula (3a), $R^{31}$ and $R^{32}$ are each independently a single bond or a divalent hydrocarbon group, and $X^{34}$ to $X^{36}$ are each independently a hydrogen atom, a halogen atom, a monovalent hydrocarbon group, a monovalent halogenated hydrocarbon group, —$OR^{33}$, or a group represented by the general formula (3b), and $R^{33}$ to $R^{36}$ are each independently a hydrogen atom, a halogen atom, a monovalent hydrocarbon group, or a monovalent halogenated hydrocarbon group.

14. A method for producing a modified sulfide solid electrolyte, the method comprising: mixing a sulfide solid electrolyte having a BET specific surface area of 10 $m^2/g$ or more and containing a lithium atom, a sulfur atom, a phosphorus atom, and a halogen atom, an epoxy compound, and an organic solvent; and removing the organic solvent, wherein the epoxy compound has a molecular weight of 60 or more and 400 or less.

15. The method for producing a modified sulfide solid electrolyte according to claim 14, wherein the organic solvent is at least one solvent selected from an aliphatic hydrocarbon solvent, an alicyclic hydrocarbon solvent, an aromatic hydrocarbon solvent, an ether solvent, an ester solvent, and a nitrile solvent.

16. A modified sulfide solid electrolyte comprising: a sulfide solid electrolyte having a BET specific surface area of 10 $m^2/g$ or more and containing a lithium atom, a sulfur atom, a phosphorus atom, and a halogen atom; and an epoxy compound, wherein the epoxy compound has a molecular weight of 60 or more and 400 or less.

17. An electrode mixture comprising the modified sulfide solid electrolyte according to claim 16 and an electrode active material.

18. A lithium ion battery comprising the electrode mixture according to claim 17.

* * * * *